United States Patent
Tessier et al.

(10) Patent No.: US 11,587,464 B2
(45) Date of Patent: Feb. 21, 2023

(54) SYSTEM AND METHOD FOR IMPROVED MEDICAL SIMULATOR

(71) Applicant: THE GENERAL HOSPITAL CORPORATION, Boston, MA (US)

(72) Inventors: Paul Tessier, Lynnfield, MA (US); Olin Lathrop, Boston, MA (US); James Gordon, Boston, MA (US); Mark Ottensmeyer, Cambridge, MA (US); Aaron Panone, Somerville, MA (US); Michael Wollowitz, Chatham, NY (US)

(73) Assignee: The General Hospital Corporation, Boston, MA (US)

( * ) Notice: Subject to any disclaimer, the term of this patent is extended or adjusted under 35 U.S.C. 154(b) by 90 days.

(21) Appl. No.: 16/660,450

(22) Filed: Oct. 22, 2019

(65) Prior Publication Data

US 2020/0051462 A1   Feb. 13, 2020

Related U.S. Application Data

(63) Continuation of application No. 14/783,957, filed as application No. PCT/US2014/034119 on Apr. 15, 2014, now Pat. No. 10,460,625.

(60) Provisional application No. 61/844,126, filed on Jul. 9, 2013, provisional application No. 61/843,081, filed on Jul. 5, 2013, provisional application No. 61/812,090, filed on Apr. 15, 2013.

(51) Int. Cl.
G09B 23/28 (2006.01)

(52) U.S. Cl.
CPC .................. G09B 23/288 (2013.01)

(58) Field of Classification Search
CPC ...... G09B 23/288; G09B 23/32; G09B 23/30; G09B 23/28; G09B 23/285; G09B 23/281; G09B 23/34; G09B 23/286; G09B 23/306
USPC ........................................... 434/267
See application file for complete search history.

(56) References Cited

U.S. PATENT DOCUMENTS

| 6,443,735 B1 | 9/2002 | Eggert et al. |
| 2004/0228494 A1 | 11/2004 | Smith |
| 2007/0054254 A1* | 3/2007 | Cook .................. G09B 23/28 434/262 |
| 2007/0105082 A1 | 5/2007 | Laerdal et al. |

(Continued)

FOREIGN PATENT DOCUMENTS

WO     2008018889 A2    2/2008

OTHER PUBLICATIONS

Von Lubitz, et al., Simulation-Based Medical Training: The Medical Readiness Trainer Concept and the Preparation for Civilian and Military Medical Field Operations, Virtual Reality International Conference, Laval Virtual, May 2001, 10 pages.

(Continued)

*Primary Examiner* — Kurt Fernstrom
(74) *Attorney, Agent, or Firm* — Quarles & Brady LLP

(57) ABSTRACT

A system and method for providing a medical simulation device that utilizes open software platforms and provides functionality in both software and hardware modules is disclosed. The medical simulation system facilitates plug and play operation with installed hardware and software modules that are automatically recognized by the system for compatibility and the system configures itself according to identification information of the hardware module.

13 Claims, 26 Drawing Sheets

(56) References Cited

U.S. PATENT DOCUMENTS

| | | | |
|---|---|---|---|
| 2007/0117077 A1* | 5/2007 | Gordon | G09B 23/28 434/262 |
| 2007/0122785 A1* | 5/2007 | Eggert | G09B 23/281 434/272 |
| 2008/0227073 A1* | 9/2008 | Bardsley | G09B 23/34 434/267 |
| 2009/0263704 A1 | 10/2009 | Batra | |
| 2009/0305212 A1 | 12/2009 | McKenzie et al. | |
| 2010/0167251 A1* | 7/2010 | Boutchko | A61B 5/416 434/267 |
| 2010/0196865 A1* | 8/2010 | Kays | G09B 23/32 434/268 |
| 2010/0232615 A1 | 9/2010 | Sorlander et al. | |
| 2011/0117881 A1 | 5/2011 | Luoma et al. | |
| 2013/0071826 A1 | 3/2013 | Johnson | |
| 2014/0017650 A1* | 1/2014 | Romero | G09B 23/30 434/270 |

OTHER PUBLICATIONS

Van Meurs, et al., Functional Anatomy of Full-Scale Patient Simulators, Journal of Clinical Monitoring, 1997, 13:317-324.
European Patent Office, Extended European Search Report, Application No. 14785506.8, dated Sep. 21, 2016.
PCT International Search Report and Written Opinion, PCT/US2014/034119, dated Nov. 20, 2014.

* cited by examiner

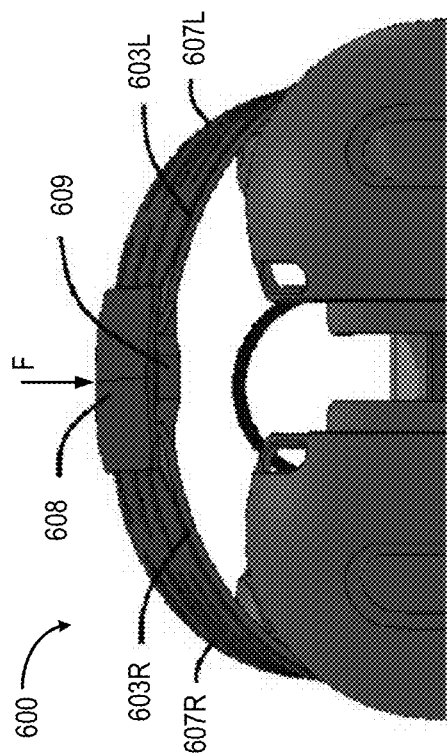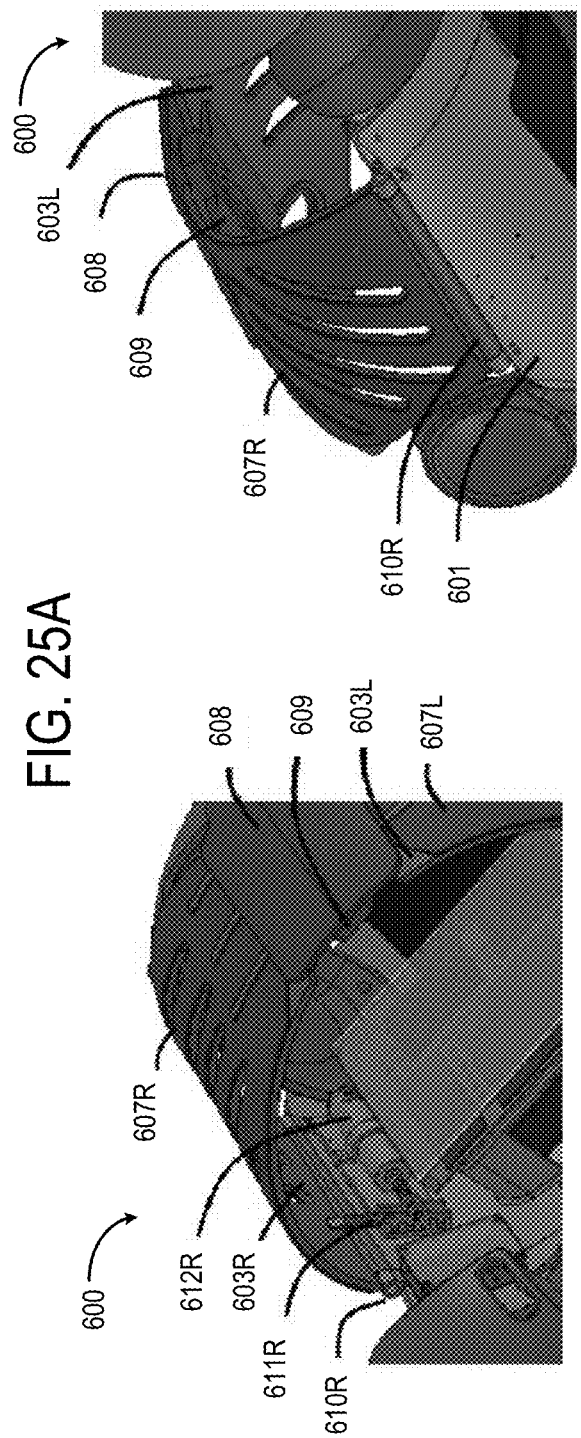

SYSTEM AND METHOD FOR IMPROVED MEDICAL SIMULATOR

CROSS-REFERENCE TO RELATED APPLICATIONS

This application is a continuation application of U.S. patent application Ser. No. 14/783,957 filed Oct. 12, 2015, which represents the national stage entry of PCT International Patent Application No. PCT/US2014/034119 filed Apr. 15, 2014, which claims the benefit of U.S. Provisional Patent Application No. 61/812,090 filed on Apr. 15, 2013, U.S. Provisional Patent Application No. 61/843,081 filed on Jul. 5, 2013, and U.S. Provisional Patent Application No. 61/844,126 filed on Jul. 9, 2013, the contents of each of which are hereby incorporated by reference in their entirety for all purposes.

STATEMENT REGARDING FEDERALLY SPONSORED RESEARCH

This invention was made with government support under DoD/W81XWH09-2-0001 awarded by the Department of Defense. The government has certain rights in the invention.

BACKGROUND OF THE INVENTION

It has been well documented that extensive experience of activities in a domain is necessary to reach very high levels of performance. Deliberate practice is an important element in obtaining the required experience. Unfortunately, deliberate practice is not easy to obtain in medicine due to the intrinsic hazards and complexities of patient care. The use of medical simulators is an alternative to "practicing" on patients and allows skills development without putting patients at risk.

There are a variety of manikin-based, both full-body and partial body, medical simulators available for use in both cognitive and procedural training of clinical personnel. These manikin-based medical simulators can be segmented into three categories, namely, high-fidelity manikin simulators, resuscitation and patient care simulators, and task simulators.

High-fidelity manikin simulators are full-body simulators fitted with sensors and actuators to simulate a patient and react to interventions and therapies. The simulation can be operated by a trainer or utilize physiologic and pharmacologic models to create autonomous reactions. Many of the high-fidelity solutions currently on the market embed most of the support services into the manikin. While this approach allows for a self-contained, highly mobile solution, it tends to result in an expensive solution that is not easily scalable. Special components need to be selected or designed to fit within the manikin, thereby limiting flexibility in the implementation and increasing cost. An example is using an embedded processor in the manikin versus an external laptop. Many users will already have a laptop that can be used for simulation, thus reducing cost. Substituting a different laptop with more processing power is easier than replacing a custom, embedded board if an upgrade is required. In addition, these embedded system components take up valuable space in the manikin that could be used to house modules to provide more training options.

Resuscitation and patient care simulators use a manikin comprised of at least a head and torso up to a full body manikin and are targeted at resuscitation and patient care training. These simulators are most commonly used for procedural training, such as basic life support (BLS) training and advanced life support (ALS) training. Most resuscitation and patient care simulators fall into a mid-range of pricing and cost significantly less than high-fidelity manikin simulators.

The category of task simulators includes partial body models that train for a particular task, procedure, or anatomic region of the body. These simulators are typically used for very specific procedural training. A majority of task simulators are low priced units, but larger, more capable units can be in the mid-range of pricing.

Organizations providing medical training (e.g., hospitals, medical schools, and nursing schools) frequently have a mix of these manikin based simulator products to satisfy training needs which results in significant cost, physical space requirements, and maintenance difficulties. Additionally, there is a large gap in the mid-range of the price and performance curve for medical simulators. Thus, users are often forced to choose between low to mid-priced products focused on procedural training or high-end expensive products focused on cognitive training. There is very little compatibility and interoperability between products, and there is limited modularity and configurability of individual products. For example, physical modularity in current products is typically limited to optional limbs (e.g., IV arm, blood pressure arm, trauma limbs, etc.) or interchangeable genitalia. Software modularity, however, is typical focused on providing training scenarios rather than modular software features. As a result, simulators cannot be interchanged or easily configured for different training needs to provide an open system having both physical and software modularity manufacturers to be interchanged.

Further, most high-fidelity manikin simulators and many resuscitation and patient care simulators contain a central area in the manikin for electronics that includes processing and interfaces for sensors, actuators and other functions. The electronics are designed to have all of the desired and/or anticipated driver circuits and processing requirements. Any circuitry included for future functions typically adds cost and size to the core electronics and may not get utilized. The sensors and actuators that are distributed within the manikin are individually wired to the electronics, resulting in a large wiring harness running to the core electronics. Each actuator or sensor typically needs to be plugged into a specific location in the electronics adding to the complexity. The manikin must also include a power source (e.g., a battery or a power supply) that is capable of powering all of the provided features whether present or not. Therefore, it would be desirable to have a distributed system in the manikin that is highly scalable and flexible to eliminate the restrictions and drawbacks of current manikin systems.

Another common issue in manikin based medical simulators is the generation of body sounds, such as heart, lungs, and bowel sounds. Clinicians listen to these sounds through a stethoscope (called auscultation) to determine if a patient's organs are healthy by evaluating frequency, intensity, duration, number, and quality of sounds. Body sounds have been simulated using a variety of techniques including internal speakers, location-based sound transmission, and remote controlled sound transmission.

Using internal speakers involves placing speakers inside a manikin at locations where sounds need to be heard. This technique allows a standard stethoscope to be used for the simulation. However, this approach has many drawbacks and limitations. For example, sound quality can be poor due to resonances and vibrations in the manikin, and the low-end frequency response can be poor due to limited speaker size.

In addition, localizing sounds to a particular area of the manikin can be difficult since sounds travel within the manikin. Further, noise from other system components, such as motors and solenoids, can easily be picked up with the stethoscope.

To overcome the drawbacks and limitations of using internal speakers, techniques, such as location-based sound transmission, have been used to provide a secondary sound transmission based on stethoscope location. With the location-based sound transmission technique, sensors in the manikin are activated or read with a special stethoscope which determines where the stethoscope is placed on the manikin. Based on the location of the stethoscope, the appropriate sound for that location is sent to the special stethoscope using wired or wireless techniques. Alternatively a control signal is sent to the special stethoscope indicating which sound recording to play from a list of sounds stored in the stethoscope. A variety of sensors have been used to determine the location of the stethoscope including magnets and relays, RFID elements, and capacitive signal coupling. However, the resolution of location determination is limited by the location technique used and/or the cost of providing high resolution location. Therefore, this situation can result in poor sound localization. In addition, a special stethoscope must be used that is capable of receiving the transmitted sound or control signals which further increases the cost and complexity of the system.

Remote controlled sound transmission is similar to the location-based sound transmission technique, but location is determined by a trainer rather than an automated technology. A trainer observes where the stethoscope has been located by the trainee and selects the appropriate sound to transmit to the stethoscope on a remote control. Similar to the location-based sound transmission, a special stethoscope must be used that is capable of receiving the transmitted sound or control signals. Additionally, this technique requires constant attention from an instructor and prohibits standalone use by a trainee.

Not only are body sounds important to simulate, but also pulses, breathing and other functions which trainees can observe and feel to simulate interaction with a patient are important for manikin-based simulators. However, the realism and cost of these simulated physiological functions varies greatly depending on the particular implementation.

As just described, a basic function that is important to simulate in a simulator manikin is a patient's pulse. Checking a pulse is one of the easiest ways to determine if a patient's heart is beating, what the heart rate is, and whether the rate is regular or irregular. Pulses have been simulated using a variety of techniques including bulb and tube, air or fluid pressure, and a solenoid driver.

The bulb and tube approach entails running a length of flexible tubing, for example silicone tubing, to the pulse points on a manikin. The tubing is connected to an external bulb that a trainer can squeeze which causes the pressure in the tubing to rise and the tube to stretch causing a pulse along the tube. Being manual, this method is prone to human error and poor repeatability.

The air or fluid pressure technique is similar to the bulb and tube method, however the tubing is pulsed with air from a compressor or fluid from a pump. The pulsations are controlled automatically, thus improving reliability and repeatability. However, the compressor or pump adds significant cost, increases power consumption, and can create undesirable noise. In addition, valves need to be used if the different pulse points need to be control separately, thereby adding to the cost and complexity of the implementation.

A solenoid driver is an alternative to using tubing to create a pulse using a solenoid mechanism. Energizing the solenoid causes a plunger to push on an element that is meant to simulate a section of an artery. However, the resulting pulse tends to feel artificial due to the rigidity of the simulated artery and/or the vertical movement, rather than a flowing and expanding movement.

Another basic function that is important to simulate in a simulator manikin is the breathing motion of the patient, particularly when coupled with a cardiopulmonary resuscitation (CPR) mechanism. The CPR mechanism is typically implemented using a movable or flexible chest plate supported by a compression mechanism (e.g., a spring, shock absorber and hinged support). The compression mechanism fills much of the chest cavity which inhibits other training modules, such a heart and lungs models, from being used. This design also produces chest motion during compression that is not natural and limits the way that breath motion can be simulated. Breath motion in such a system is typically done by inflating a bladder that moves the chest plate. The resulting motion is not natural since the sides of the rib cage do not move as occurs during actual breathing.

Thus, none of the above described techniques produce a reliable, cost-effective and automatic means of creating realistic body sounds, pulses, and breathing motions. More generally, the preceding examples serve to illustrate that there is a substantial body of open-source, publicly available material to provide the mathematical models and parameters describing physiological behaviors. Similarly, there are numerous equation solver engines which can process those equations and generate simple tabular and graphical outputs. However, what is missing is a common platform that allows integration and interoperability between models, tools that allow users to easily modify and test models within an integrated system, and integration with flexible and scalable output devices.

Thus, it would be beneficial to provide an integrated, low-cost simulation platform where the advantages of cognitive and procedural training can be merged and where users can customize the system to suit a wide variety of applications from simple to complex. It would be beneficial to have a highly scalable, modular medical simulation system that can be easily configured by users for their specific needs with different types of physical and/or software modules. A modular solution allows specific features to be combined for an application rather than users paying for features that are not needed or going without features that are highly desirable, or being limited to just procedural or just cognitive training. Such a system also allows users to buy and support a single simulation platform rather than having to buy multiple, incompatible products. In addition, it would be beneficial for a base product to be created that can receive modules in order to reduce the initial cost and effort of manikin implementation and allows the manikin system to migrate with changing training needs. Lastly, it would be beneficial to provide an open system so that modules could be provided by different vendors, thus allowing the development cost to be spread out across vendors and allowing users to buy the best in class offerings for a particular application.

SUMMARY OF THE INVENTION

The present invention overcomes the aforementioned drawbacks by providing a medical simulation system that utilizes an open software platform and provides functionality in both software and hardware modules. The medical simulation system allows for easy discovery and utilization of system services across a spectrum of hardware modules and applications, thus reducing the complexity and time of implementation. The medical simulation system also facilitates plug and play operation with installed hardware and software modules that are automatically recognized by the system for compatibility and the system configures itself according to identification information of the hardware and/or software modules.

In accordance with one aspect of the invention, a medical simulation system is disclosed. The medical simulation system includes a human manikin and one or more hardware modules in the human manikin. The hardware module includes identification information and provides incremental functionality to the human manikin. The system also includes an interface processor configured to receive the identification information from hardware module, and a computational device is in communication with or included in the interface processor. The computational device receives the identification information and is configured to access a memory having stored thereon an arbitrator function. The arbitrator function is executed by the computational device in order to automatically identify a compatibility status of the hardware module with the human manikin and, if present, another hardware module based on the identification information.

In accordance with another aspect of the invention, a medical simulation system is disclosed. The medical simulation system includes a human manikin and one or more hardware modules in the human manikin. The hardware module includes identification information and provides incremental functionality to the human manikin. The system also includes an interface processor configured to receive the identification information from hardware module, and a computational device is in communication with or included in the interface processor. The computational device receives the identification information and is configured to access a memory having stored thereon a configuration function. The configuration function is executed by the computational device in order to automatically configure the medical simulation system based on the identification information.

In accordance with another aspect of the invention, a method of providing medical training is provided. The method includes providing a human manikin that includes one or more hardware modules. The hardware modules include identification information and provide incremental functionality to the human manikin. An interface processor is configured to receive the identification information from the hardware modules. A computational device is in communication with or included in the interface processor and receives the identification information. An arbitrator function that is stored on the computational device then automatically determines a compatibility status of the hardware module with the human manikin and, if present, another hardware module based on the identification information.

In accordance with yet another aspect of the invention, a method of providing medical training is provided. The method includes providing a human manikin that includes one or more hardware modules. The hardware modules include identification information and provide incremental functionality to the human manikin. An interface processor is configured to receive the identification information from the hardware modules. A computational device is in communication with or included in the interface processor and receives the identification information. A memory is then accessed which has a configuration function stored thereon.

The configuration function is then executed on the computational device to automatically configure the human manikin based on the identification information.

In accordance with another aspect of the invention, a manikin for cardiopulmonary resuscitation (CPR) training is disclosed. The manikin includes a supporting base and a compression mechanism. The compression mechanism is provided above a chest cavity and includes a sternum plate and a sternum spring. The compression mechanism is configured to provide a means for applying chest compressions during CPR training. The manikin further includes a structural rib cage coupled at one end to the supporting base and at another end to the sternum plate and the sternum spring. The ends of the structural ribs are spaced apart by the sternum spring to define the chest cavity. When the compression mechanism receives a compression force, the sternum plate engages the structural ribs to compress the sternum spring. The chest cavity remains substantially unobstructed in order to receive one or more modules that provide incremental functionality to the manikin.

Various related modular and separable components include a manikin torso utilizing a structural back plate(s) to which other elements are attached providing a flexible platform for insertion of a variety of modules. The design leaves the shoulder/neck area and abdomen open for optional modules. Exchangeable mounting elements allow different arms, legs and heads to be utilized. These mounting elements can be removed completely for insertion of more advanced modules such as complete shoulder modules or hip modules. The removable leg mounts allow a variety of hip and leg configurations including the ability to use modules of either male or female anatomy.

Additionally, a chest mechanism that provides for chest compressions while leaving the chest cavity open for insertion of other modules. The chest mechanism is comprised of two rib cage elements (left and right sides) that attach to a structural back plate with a hinge or other flexible element. Alternately the rib cage elements themselves can be flexible. The other end of the rib cage elements connect to a sternum spring mechanism that spaces apart the rib cage elements. In one embodiment, the sternum spring mechanism is made of a flexible material with a web-like structure that allows the rib cage elements to move toward one another when a compressing force is applied and returns the rib cage elements to their original position when the compressing force is removed. The rib cage elements can detach from the sternum spring mechanism and allow access to the chest cavity to insert modules, such as heart and/or lung models.

Further, a breathing mechanism that provides for realistic breathing motion including simulation of a collapsed lung may be provided. The breathing mechanism includes two flexible rib elements (left and right sides) that lay over a supporting chest structure. One end of the flexible ribs is attached to the supporting chest structure near the sternum area. The opposite end of the flexible ribs connects to a mechanism that can apply a bending force to the flexible ribs. In one embodiment, the force applying mechanism is comprised of a motor/gear box assembly that actuates a rack and pinion mechanism. The force applying mechanism pushes up on the flexible ribs causing them to "bow" creating a breathing-like motion. A sternum plate is attached through the sternum and overlaps the flexible ribs. When the flexible ribs are bowed, a force is applied to the sternum plate. The sternum plate has a tab in the center that passes through an opening in the sternum holding it in place but allowing it to "float". Thus when the flexible ribs are bowed the sternum plate rises and when the flexible ribs are relaxed, the sternum plate returns to its resting position. The left and right flexible ribs can be bowed separately allowing simulation of a collapsed lung by bowing just one side. Since the sternum plate floats, it tilts when only one flexible rib is bowed.

Lastly, a chest mechanism that allows a median sternotomy to be performed and rib spreaders utilized for simulation of cardiothoracic surgery may be provided. The chest mechanism is comprised of two rib cage elements (left and right sides) that attach to a structural back plate with a hinge or other flexible element. Alternately, the rib cage elements themselves can be flexible. The other end of the rib cage elements connect to a simulated sternum element. The mechanism may be covered with a skin like covering. The simulated sternum element can be sawed using a sternal saw after which rib spreaders can be used to separate the rib cage elements. Either the flexible nature of the rib cage elements or a separate spring mechanism creates a force for the spreaders to work against and to return the ribs to their normal position when the rib spreader is removed. The sternum element and the skin covering are repairable or replaceable for future use.

In accordance with another aspect of the invention, a pulse module for simulating a pulse motion in a manikin is disclosed. The pulse module includes a microcontroller coupled to a communication interface and configured to communicate over a communication bus. The pulse module also includes a circuit controlled by the microcontroller to actuate a pulse assembly. The pulse assembly includes a pulse mechanism actuated by a solenoid to generate a palpable pulse, and a frame coupled to a body of the solenoid. An actuator is coupled to the solenoid, and a bladder is coupled to the frame. The bladder engages the actuator, and the bladder includes a cavity partially filled with a fluid. When the solenoid is energized, a force is exerted on the actuator causing the actuator to compress the cavity of the bladder and forcing the fluid into another portion of the bladder, thereby expanding the bladder to create the pulse motion.

In accordance with another aspect of the invention, a body sound module for simulating at least one body sound is disclosed. The body sound module includes one or more source coils positioned within the human manikin. A microcontroller is coupled to a communication interface and configured to communicate over a communication bus. The body sound module also includes a memory, such as flash memory, having one or more audio signals accessible by the microcontroller. A digital-to-analog converter is coupled to an amplifier that is configured to activate the one or more source coils and generate an analog output. The microcontroller receives one or more audio signals and outputs a digitized sound stream to the digital-to-analog converter. The analog output of the digital-to-analog converter is amplified by the amplifier to activate the source coil to simulate the body sound. A stethoscope module may be configured to interact with the body sound module. The stethoscope module includes an amplifier circuit configured to amplify or filter a signal received from the receiving coil. The amplifier circuit is coupled to a speaker that generates the body sound.

In accordance with yet another aspect of the invention, a medical simulation system is disclosed. The medical simulation system includes a human manikin and one or more software modules. The software modules include identification information and provide incremental functionality to the human manikin. The medical simulation system further includes an interface processor configured to receive the identification information from the one or more software modules. A computational device is in communication with or included in the interface processor to receive the identification information. The computational device is configured to access a memory having stored thereon the one or more software modules and an arbitrator function. When the arbitrator function is executed by the computational device, a compatibility status of the one or more software modules with the human manikin or, if present, another software module or a hardware is automatically determined based on the identification information.

In accordance with another aspect of the invention, a manikin for medical simulation training is disclosed. The manikin includes a supporting base and a structural rib cage coupled to the supporting base. The structure rib cage is supported by the supporting base without required structural attachment to other components of the manikin. The manikin also includes a set of mounts coupled to the supporting base that are configured to receive at least one module that provides incremental functionality to the manikin. The set of mounts are not required to be structurally attached to the structural rib cage or each other.

The foregoing and other aspects and advantages of the invention will appear from the following description. In the description, reference is made to the accompanying drawings which form a part hereof, and in which there is shown by way of illustration a preferred embodiment of the invention. Such embodiment does not necessarily represent the full scope of the invention, however, and reference is made therefore to the claims and herein for interpreting the scope of the invention.

BRIEF DESCRIPTION OF THE DRAWINGS

FIG. 5 is a flow chart setting forth the steps of processes for a startup procedure that may be performed when the medical simulation system is turned on.

FIG. 25A is an enlarged bottom perspective view of the torso manikin of FIG. 25A.

FIG. 25B is an enlarged top perspective view of the torso manikin of FIG. 25A.

FIG. 25C is an enlarged rear perspective view of the torso manikin of FIG. 25A.

DETAILED DESCRIPTION OF THE INVENTION

Figure 1:
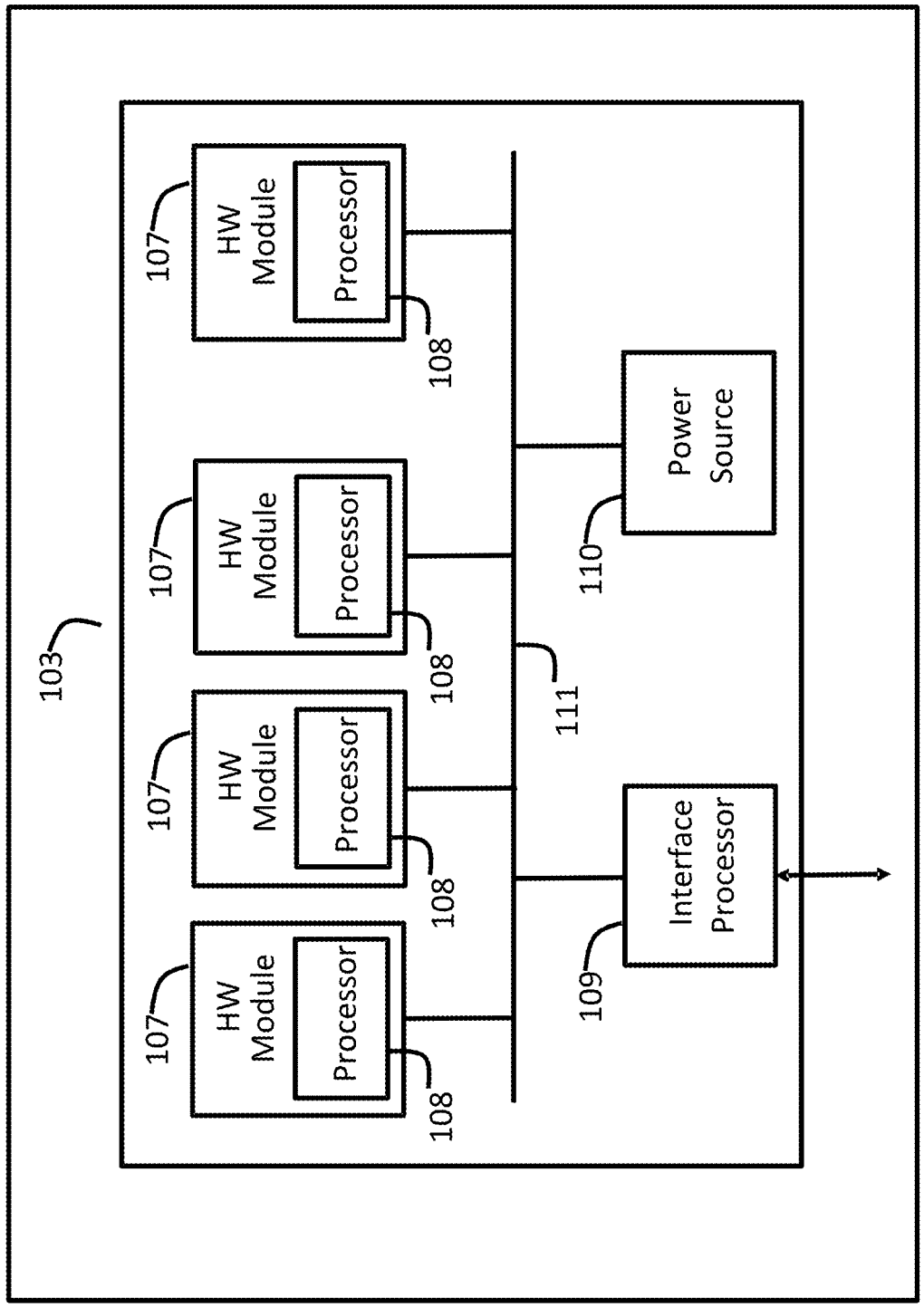
FIG. 1 is a schematic view of a manikin including modules for operation in a medical simulation system according to one embodiment of the disclosure.
Figure 2:
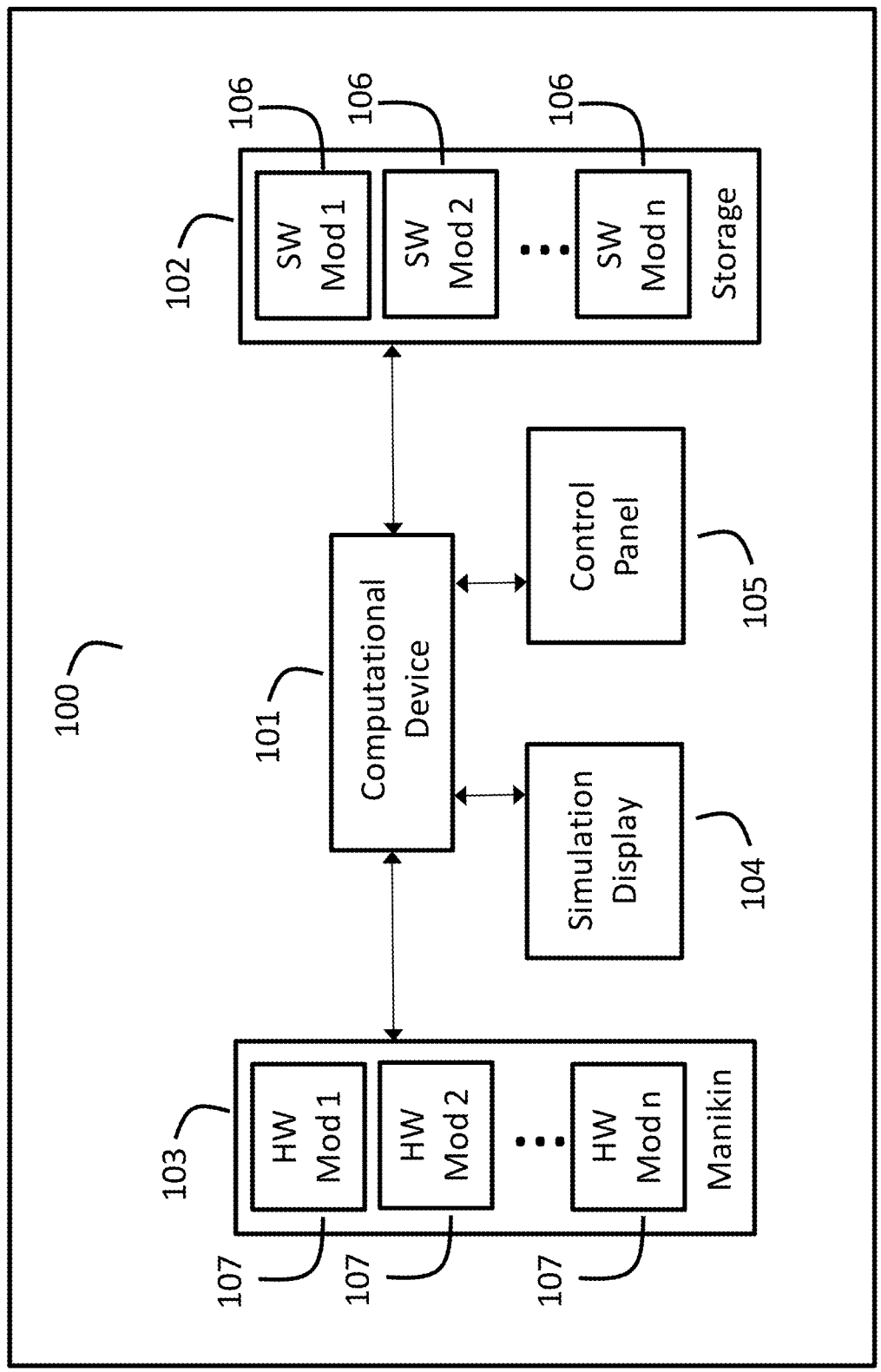
FIG. 2 is a schematic view of the medical simulation system of FIG. 1 including hardware and software modules.

Referring now to FIGS. 1 and 2, schematic views of a medical simulation system 100 in which a human manikin 103 may operate is provided. In general, the medical simulation system 100 includes the human manikin 103, which may be a modular manikin for example, into which hardware modules 107 can be inserted to provide incremental functionality to the manikin 103. The medical simulation system 100 also includes a computational device 101 and electronic storage 102 into which software modules 106 can be loaded. The hardware modules 106 and the software modules 107 can identify themselves to the computing device(s) in the system 100 which assesses and configures the system 100 accordingly. Assessment of the system 100 includes determining if the resources provided are aligned with the resources to be consumed. Assessment of the system 100 also includes determining if the required modules 107 are installed and whether the modules 107 meet the needs of the system 100. In addition, assessment of the system 100 determines whether there is a conflict between the modules 107. Based on the assessment, the system 100 determines what modules 107 to use and how to use them and configures the system 100 accordingly. Configuration of the system 100 includes enabling the appropriate modules 107, setting parameters in the selected modules 107, establishing the content of a simulation display 104, enabling the appropriate controls, and setting the available selections for a control panel 105.

In one non-limiting example, the hardware module 107 may be a small, low-cost, energy efficient pulse module that creates a realistic pulse. The modular pulse device compatible with the highly scalable, modular medical simulation system 100 may be placed in each location in the manikin were a pulse is to be simulated without needing to run tubing and/or a dedicated wiring harness to each location.

In another non-limiting example, the hardware module 107 may be a body sound module capable of generating realistic, localized body sounds that is small, flexible, low-cost, and energy efficient. The modular sound device compatible with the highly scalable, modular medical simulation system 100 may be placed in each location in the manikin where a sound is to be simulated without needing to run a dedicated wiring harness to each site and/or deploy a location determining technology that covers all locations where a sound could be generated. Both the modular pulse device and the modular sound device have an energy efficient design that provides for longer battery life and/or allows a smaller battery to be used to power the system. Being small and flexible, the hardware modules 107 can be placed in locations with limited space and in locations where space needs to be reserved for other functions or modules.

Returning to FIG. 1, the hardware modules 107, which may also contain software and/or firmware can be inserted to provide incremental functionality to the manikin 103. Each hardware module 107 may be self-contained and includes processing and circuitry for any associated sensors, actuators, or other functions. Each hardware module 107 may also include its own power source, for example, a battery (not shown). The hardware modules 107 connect to a communication and power bus 111, the communication portion of which may be a wired or wireless communication network, a controller area network (CAN) interface, or an audio network. An interface processor 109 provides communication with the hardware modules 107 over the communication and power bus 111 and also provides communication outside the manikin 103. The communication component of the communication and power bus 111 may use any parallel or series digital communication technique, for example, and may be wired or wireless. A power source 110 provides power to all the manikin 103 components that require power (i.e., components that are not self-powered) over the communication and power bus 111.

Additionally, each hardware module 107 contains a processor 108 that provides communication over the communication and power bus 111 and also provides the hardware module's 107 operating functions (e.g., actuator drive). Each hardware module 107 is capable of communicating its identity, requirements, and operating characteristics over the communication and power bus 111. The communication and power bus 111 may be a multi-drop bus, for example, allowing the hardware modules 107 to be plugged along the bus 111. In an alternative embodiment, the communication and power bus 111 may be deployed in a star or mesh networking configuration. Thus, modular system 100 can help reduce costly core electronics and allows the cost to scale with the implementation. In addition, wiring in the manikin 103 is also simplified so that the hardware modules 107 may be connected into any available location on the communication and power bus 111 where no specific location is required.

Returning to FIG. 2, one embodiment of the medical simulation system 100 that includes the modular manikin 103 is shown. The hardware modules 107 in the manikin 103 may identify themselves through the interface processor 109 to the computational device 101. The computational device 101 may also contain and/or interface to the electronic storage 102. The software modules 106 can be loaded into the system 100 to provide incremental software based functionality to the system 100. For example, the software modules 106 may be associated with one or more of the hardware modules 107, or may be independent. Simulation information is presented to a user on the simulation display 104, and controls to operate the system 100 are presented on the control panel 105. In some embodiments, the computational device 101, the simulation display 104, and the control panel 105 may be combined or distributed in different physical elements of the medical simulation system 100. For example, the computational device 101 could be combined with the simulation display 104 (e.g., a laptop with display and computing capabilities) or the control panel 105, or could be included in the interface processor 109 or otherwise included in the manikin 103. The computation device 101 may also be distributed across these other components, and the electronic storage 102 may also be distributed across these other components.

Figure 3:
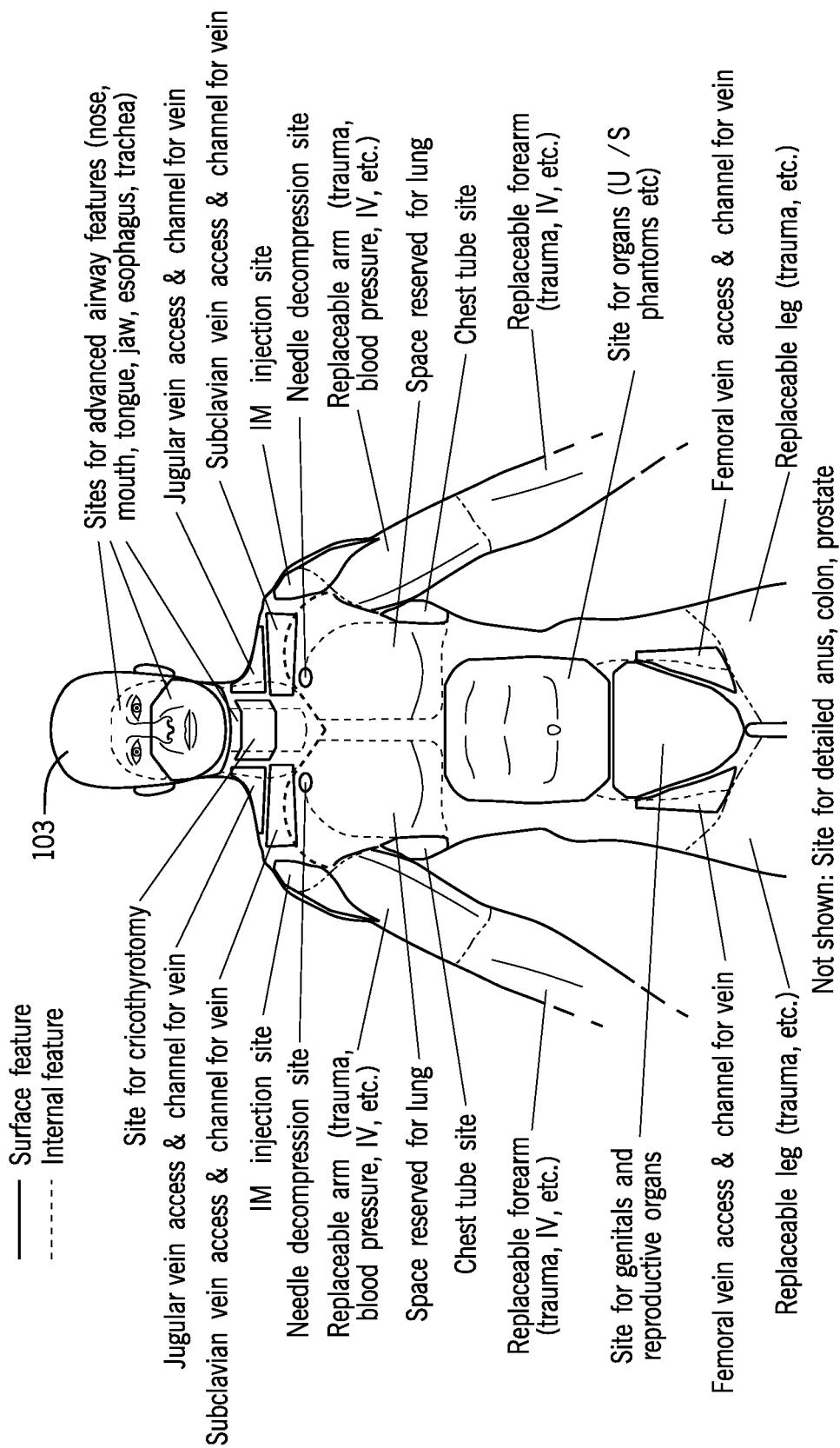
FIG. 3 is a perspective view of the manikin showing varying types of modularity and resulting functions enabled by the manikin through the modules of FIG. 2.

Turning now to FIG. 3, an example of the type of modularity and resulting functions that could be enabled by the modular manikin 103 through one or more of the hardware modules 107 and software modules 106 are shown. The hardware modules 107 are inserted into the manikin 103 in spaces created for the particular purpose and simply connect to the communication and power bus 111 as appropriate. For example, the hardware module 107 may be a pulse module configured to provide a palpable pulse. Additionally, the hardware module 107 may be a blinking module to generate movable eye lids to simulate blinking on the manikin 103. The hardware module 107 may also be a chest module, for example, having an electromechanical means to create chest rise and fall. Alternatively, the hardware module 107 may be a sound module to communicate heart and lung sounds, for example, to a stethoscope when the stethoscope is in correct area on the manikin 103. Regardless of the type of hardware module 107, each hardware module 107 can be provided by different manufacturers. For example, some modules may have related features that impact the control panel 105 or the simulation display 104 and some may require support services. The medical simulation system 100 can be anticipated and provided for in the requirements for these other components. For example, the manikin 103 may be configured to distribute support services to the different hardware modules 107 and software modules 106 by providing tubing and wiring for the support services along with standardized connection means.

In general, the manikin 103 may include several features, including, but not limited to, auscultation, palpable abdominal area, palpable intercostal ribs, independent left and right chest motion (e.g., rise and fall), chest rise and fall with ventilation (both manual and mechanical), configurable pupil size, detailed mouth, nose and airway, realistic esophagus, trachea and nasal passage, removable dentures, simulated tongue edema, simulated laryngospasm, jaw thrust, movement/bending of neck, shoulder, hips and knee, bending at wrist and ankle, skin covering that looks and feels realistic, therapy and procedure support, realistic fit of mask to face, simulated airway blockage, compatible and usable with ventilator, adjustable airway resistance, site with replaceable materials suitable for performing cricothyrotomy, pre-existing site in manikin 103 to insert needle for simulated needle decompression, site with replaceable materials suitable for inserting chest tube, sites at shoulder and thigh with replaceable materials suitable for intramuscular injection (IM) injection, site with replaceable materials suitable for intravenous (IV) access to external jugular vein, site with replaceable materials suitable for IV access to the median cubital vein, the cephalic vein and the basilic vein, site with replaceable materials suitable for catheterization of the jugular vein, site with replaceable materials suitable for catheterization of the subclavian vein, and site with replaceable materials suitable for catheterization of the femoral vein. The manikin 103 may also include the ability to withstand defibrillator shock without damage to the medical simulation system 100 or risk to the user, the ability to withstand external pacing without damage to the medical simulation system 100 or risk to the user, the ability to withstand chest compressions without damage, the ability to select ventricular fibrillation and ventricular tachycardia for an ECG trace, and realistic chest flexing and required force for CPR simulation.

Figure 4:
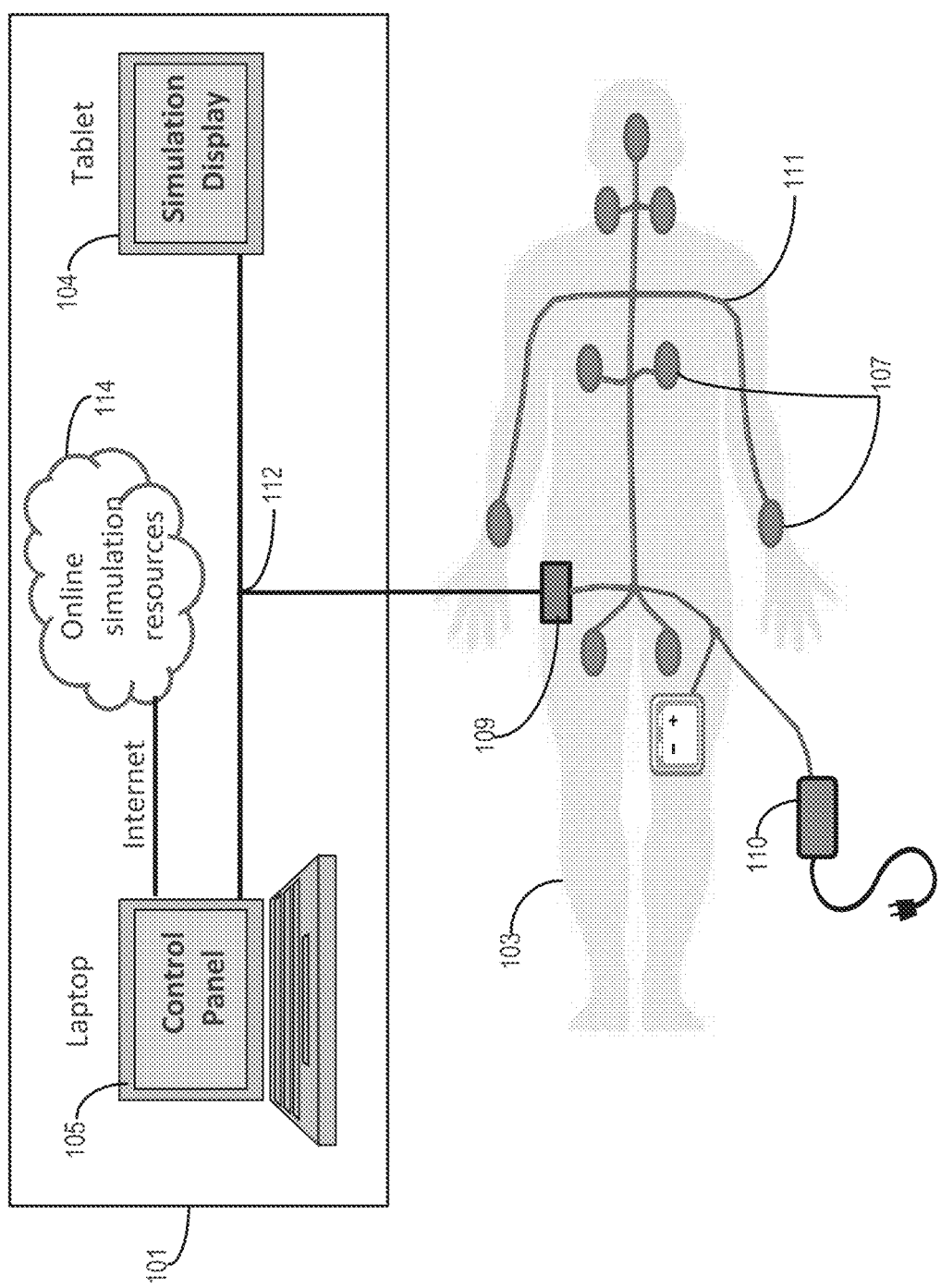
FIG. 4 is a schematic diagram of one implementation of the medical simulation system.

Turning now to FIG. 4, a schematic diagram of one implementation of the medical simulation system 100 is provided. In this embodiment, the computational device 101 is distributed between a laptop computer that is acting as the control panel 105 and a tablet computer acting as the simulation display 104. Alternatively, the simulation display 104 may be implemented on a netbook, for example. The laptop and tablet can communicate with each other and the manikin 103 through a wired or wireless network 112. The network 112 may be, for example, a wired or wireless communication channel such as USB 3.0 or LAN. Connection to a WAN (i.e., the Internet) allows the control panel 105 to access online simulation resources 114, such as web-based physiological and pharmacological models. The hardware modules 107 in the manikin 103 communicate over to the communication and power bus 111 to the interface processor 109. The software modules (not shown) are loaded onto the control panel 105 (e.g., the laptop) and/or the simulation display 104 (e.g., the table). Using a laptop as the control panel 105 provides portability and operation from batteries. The type of laptop utilized can be selected based on the application providing flexibility and scalability to the medical simulation system 100. Similarly, using a tablet or netbook as the simulation display 104 can offload the task of waveform rendering from the control panel 105, and provide portability and operation from batteries.

The medical simulation system 100 may be self-configuring so the user does not need intimate knowledge of how to setup and configure the system 100. The user simply installs modules 107 which automatically identify themselves to the system 100. The system 100 in turn configures itself accordingly. Features and functions provided by the base system 100 and any installed modules 107 are presented to the user, thereby preventing confusion and/or incorrect simulations. Having standardized and well documented interfaces to the modules 107, along with automatic configuration, also make it possible for different vendors to provide modules. Unlike conventional medical simulation systems, the type, quality and functionality of the modules 107 may not need to be known ahead of time since the automatic identification and configuration of the system 100 adapts to new functions.

Returning to FIG. 2, automatic identification of the hardware modules 107 can be accomplished in multiple ways. The modules 107 could communicate all relevant information over the communication and power bus 111 or the information could be stored in a system registry contained in the electronic storage 102 or other storage available to the system. For example, the information could be stored in a registry located remotely and accessible through a wide area network. Using a system registry allows hardware modules 107 to identify themselves using limited information such as an ID number and location in the manikin 103, thereby simplifying the hardware startup process and reducing the burden on the communication and power bus 111 and the hardware modules 107. This approach also provides for centralized control of the system 100 while allowing flexibility for providers of either hardware modules 107 or software modules 106. A mixed approach could also be used with some information sent by the hardware modules 107 and some information retrieved from a central registry. The following description of a central registry model will be used for simplification, but is not intended to dictate or limit the medical simulation system 100.

In one embodiment, the identifying information provided by the hardware module 107 may be a hardware identification (ID) number. The hardware ID number provides a unique identifier for the hardware module 107 that the system 100 can use to look up module information in the system registry. The ID may include a prefix indicating that the module is a hardware module 107 followed by a manufacturer number joined with a module number and a revision number. A revision number may also be provided to identify different revisions of the same module 107 from the same manufacturer, for example. Thus, manufacturers may be required to provide the module information outlined here for each module offered. The hardware ID number should be sourced by a hardware module 107 at the startup of the system 100.

In another embodiment, the identifying information provided by the hardware module 107 may be a location within the manikin 103, for example. The site the hardware module 107 is located in the manikin 103 (e.g., arm, leg, etc.) and which side (e.g., left or right) of the manikin 103 the hardware module 107 is located may provide the location information of the hardware module 107. The system 100 may want to control functions by site and/or by side. For example the system 100 may turn on femoral pulses bilaterally or may disable breathing motion just on the left side. Thus, a standardized set of locations is established, and location information should be sourced by a hardware module 107 or provided in a system registry at the startup of the system 100.

In yet another embodiment, the identifying information provided by the hardware module 107 may be related to its function and sub-function. The function may be a general class of capability, such as generating a pulse or blinking. The sub-function allows modules 107 to have different capabilities within a particular function. For example a blinking module may be for a single eye (i.e., independent operation) or for both eyes (i.e., linked operation). Thus, the modules 107 can have multiple functions.

Additionally or alternatively, the identifying information provided by the hardware module 107 may be related to the resources consumed by the hardware module 107 during operation. The system 100 is configured to check that the available resources are adequate for the installed modules 107. For example, the system 100 checks whether the power source is capable of powering the installed modules 100 that require power, or whether a fluid source is adequate for the required flow rates and volumes. More specifically, the power requirement may include, for example, how much power is required by a module 107 on average and the peak required. For example, the hardware module 107 can be self-powered and not require power from the system. In addition, a maximum peak and maximum average current than can be drawn by the module 107 based on the installed source may be provided. Thus, modules 107 requiring large amounts of power should consider providing their own power source. The fluid source requirements may include, for example, what fluid (e.g., blood, urine, etc.) at what peak flow rate, and what total volume is required by the system 100. Modules 107 may use multiple fluids. For example, the hardware module 107 can provide its own fluids and not require fluid from the system 100. In some embodiments, a maximum peak flow rate and total volume than can be drawn by a module 107 based on the installed source may be provided. Therefore, modules 107 requiring large rates or volumes should consider providing their own fluid source.

The identifying information provided by the hardware module 107, in some embodiments, may be related to what system resources are provided to the system 100. For example, resource modules, such as batteries, fluid reservoirs and pumps, supply resources to consuming modules 107. The system 100 can determine the compatibility of the installed modules 107. For example, the system may determine if the power source is capable of powering the installed modules 107, or if a fluid source is adequate for the required flow rates and/or volumes required by the system 100. Thus, a single module 107 can be both a provider and a consumer of resources. More specifically, the system 100 may determine how much power can be provided on average and for peak demand. A minimum peak and average specification may be established that a power source should provide to be minimally compatible with the system 100. Likewise, the system 100 may determine what fluid (e.g., blood, urine, etc.) is available at what peak flow rate, and what total volume is available.

The identifying information provided by the hardware module 107 may also be related to a type of system parameter(s) that the module 107 can synchronize with. For example, modules 107 may be capable of synchronizing with heart rate (e.g., pulses, heart sounds, etc.), respiration rate (e.g., breathing motion, lung sounds, etc.) or with other parameters. Additionally, what parameters can be set for the module 107 function may be determined by the system 100. Examples of parameters include, but are not limited to, inspiration/expiration ratio for breathing, pulse rise and fall rates, and blinking duration. A hardware module 107 may not have any system adjustable parameters or may have multiple parameters. Acceptable settings are the allowable values for a parameter. The acceptable settings may be a range of values or a set of fixed settings. For example blinking rate may be selectable over a range of values (e.g., 1.5 seconds to 3 seconds), and could also have a simple on/off function.

The identifying information provided by the hardware module 107 may also be related to data sourced, meaning what information can be sent from a module function. Hardware modules 107 may have sensors to detect actions by a user that are sent to the system 100. For example, a hemorrhage training leg may have a sensor to measure tourniquet force, or a RFID reader to read a RFID chip in a simulation syringe to determine the "drug" in the syringe. Data returned may be a numeric value on a predetermined scale, an identifier, or a simple yes/no or on/off binary value.

In yet another embodiment, the identifying information provided by the hardware module 107 may be related to user controls associated with the module that can be utilized through the control panel 105. For example, a control to select which lung sounds are played on a sound module in a lung location. Not all parameters, as described above, need to have a user control. Many parameter settings may be automatically controlled by scenarios and models or algorithms, or may use default settings and do not have a user control.

The system 100 may also be capable of identifying algorithms or models that are embedded in the hardware module 107 in order to identify the hardware module 107. For example, a trauma leg may have an embedded hemorrhage model. Therefore, manufacturers of hardware modules 107 with embedded algorithm/model (AM) software modules 106 should provide AM software module information in addition to hardware module 107 information. In addition, embedded Libraries (LIB Modules) may be identified by the system 100 for identification of any libraries that are embedded in the hardware module 107. For example, a sound module may have an embedded library with heart and/or lung sounds. Therefore, manufacturers of hardware modules 107 with embedded library modules should provide LIB module information in addition to hardware module 107 information.

The identifying information provided by the hardware module 107 may also be related to whether or not the hardware module 107 is capable of accepting streamed data and, if so, what data types it accepts. Some modules 107 will only be capable of using data from embedded libraries, while other modules 107 may be able to accept streamed data. Examples include sound playing modules and status display modules. Additionally, identifying information provided by the hardware module 107 may be a description of the module 107 that can be displayed to a user in controls, a dialog box, or through a help function, for example. In one embodiment, the "Name" is used to identify the hardware module 107 in a natural language format to users. A short description may also be provided which includes a brief description of the functionality of the hardware module 107. Additionally, or alternatively, a long description may be provide which may include a pointer to a file that can be of any length and is intended to provide detailed information on the hardware module 107.

Referring specifically now to the software modules 106, shown in FIG. 2, the system 100 may provide three types of software modules 106 including scenarios, algorithms/models, and libraries. Scenarios may provide initial conditions and a sequence of, or reaction to, events that simulate a patient situation. Algorithms/models may provide a mathematical representation of physiological behavior, for example, and libraries may provide a suite of data such as waveforms and/or sounds. Algorithms/models and libraries can be run at the system level or can be embedded in one of the hardware modules 107. Scenarios, however, in this embodiment, are run at the system level. Thus, users of the medical simulation system 100 do not typically interact directly with algorithms/models, which are typically invoked through a scenario. In some embodiments, scenarios can be modified in real-time by changing settings manually on the control panel 105. Other scenarios may not be capable of manual changes.

One example of identifying information that could be provided by algorithm/model (AM) software modules 106 is an AM identification (ID) number. The AM ID provides a unique identifier for an algorithm/model software module 106 that the system can use to look up module information in the system registry. The ID may include a prefix indicating that the module 106 is an algorithm/model software module followed by a manufacturer number joined with a module number and a revision number. A revision number may also be provided to identify different revisions of the same module from the same manufacturer. Thus, manufacturers may be required to provide the module information outlined here for each module they offer.

Another example of identifying information that could be provided by software modules 106, and recognized by the system 100, is a function and sub-function of the software module 106. The function may be a general class of capability, such as a heart model or lung model, and the sub-function of the software module 106 allows modules to have different capabilities within a particular function. For example, a heart model module may be for a healthy heart or for a variety of diseased hearts. Software modules 106 can also have multiple functions, such as a cardiopulmonary model that includes a heart model and lung model.

In some embodiments, the identifying information provided by the software module 106 may be related to inputs, a range, and default values, for example. What inputs are required for the module 106, the acceptable range of values for the inputs, and default values may be provided by the software module 106. Examples of inputs for a heart model, for example, may include pacing pikes and fluid volume status. In some embodiments, an AM software module 106 may have multiple parameters. The range may be the allowable values for an input, and the acceptable inputs may be a range of values or a group of fixed settings. For example, a fluid volume status may be settable over a range of values, whereas a pacing spike could be indicated by a binary value. Lastly, the default value may be the value that will be used if no other value is sourced to the module 106. If an AM software module 106 cannot operate correctly with a default input value (i.e., requires a data source), that situation is identified in the default value setting. Thus, a standardized list of data elements may be established for the system 100. The list of data elements may include inputs and sourced data to ensure unified naming of all inputs and outputs recognizing that the output of one module 106 could be the input for another module 106.

In another embodiment, the identifying information provided by the software module 106 may be related to user controls. For example, user controls to adjust vital signs that may not be utilized through the control panel 105 may be provided. Some parameter settings may be automatically controlled by models/algorithms and may not support user modification. In addition, the identifying information provided by the software module 106 may be related to data sourced. For example, what information is sent from an AM software module 106 may be provided. Data returned may be a numeric value on a predetermined scale, an identifier, or a simple yes/no or on/off binary value. Therefore, a standardized list of data elements may be established for the system 100. The list of data elements may include inputs and sourced data to ensure unified naming of the inputs and outputs recognizing that the output of one module 106 could be the input for another module 106.

Additionally, identifying information provided by the AM software module 106 may be a description of the module 106 that can be displayed to a user in controls, a dialog box, or through a help function, for example. In one embodiment, the "Name" is used to identify the AM software module 106 in a natural language format to users. A short description may also be provided which includes a brief description of the functionality of the software module 106. Additionally, or alternatively, a long description may be provide which may include a pointer to a file that can be of any length and is intended to provide detailed information on the software module 106.

Similar to the identifying information for the AM software module 106, the scenario-based (SB) software module may provide a SB identification (ID) number and identifying information to the system 100. The SB software module may provide a unique identifier that the system 100 can use to look up module information in the system registry. The ID may include a prefix indicating that the module is a scenario-based software module, followed by a manufacturer number joined with a module number and a revision number. A revision number may also be provided to identify different revisions of the same module from the same manufacturer. Thus, manufacturers may be required to provide the module information outlined here for each module they offer.

In some embodiments, the identifying information provided by the SB software module 106 may be related to required resources, such that the resources that are required in the system 100 for the scenario to operate are provided. Resources may be identified according to the function and sub-function from hardware modules, AM software modules, and LIB modules. When a scenario is selected by a user, the system 100 checks that the required functions are available and that the specific modules installed with those functions are compatible with each other (e.g., multiple sources for the same function or sub-function).

In other embodiments, the identifying information provided by the SB software module 106 may be related to the required hardware module 107 parameters, settings, and data. For example, what parameters over what settings are required and what data needs to be sourced from a hardware module 107 may be provided. This is a further refinement of the hardware module 107 requirements at a level below the function/sub-function level. When a scenario is selected by a user, the system 100 checks that the required parameters, settings, and data are available and that the specific modules installed that provide the listed functions are compatible with each other (e.g., required and sourced data elements align).

Other identifying information provided by the SB software module 106 may be related to the required AM software module inputs, ranges, and data. For example, what inputs over what ranges are required and what data needs to be sourced from an AM software module may be provided. This is a further refinement of the AM software module requirements at a level below the function/sub-function level. When a scenario is selected by a user, the system 100 checks that the required inputs, ranges, and data are available and that the specific modules with the listed functions are compatible with each other (e.g., required and sourced data elements align).

In another embodiment, the identifying information provided by the SB software module 106 may be related to preferred modules of the system 100. For example, a list of preferred AM software modules by AM ID number according to function/sub-function may be provided. Since multiple AM software modules 106 with the same function and/or sub-function could be installed, it is desirable to have one AM software module selected automatically by the system 100 rather than requiring the user to make the selection. The list of preferred modules may be grouped by function and within a group that are listed in the order of preference. In one non-limiting example, the list of preferred modules may be optional and is only done for AM software modules and LIB modules, not hardware modules. Thus, it is assumed duplicate hardware modules 107 will not exist since they cannot both occupy the same physical space within the manikin 103.

In yet another embodiment, the identifying information provided by the SB software module 106 may be related to the preferred libraries. For example, a list of preferred LIB modules by LIB ID number according to function/sub-function may be provided. Since multiple library modules with the same function and/or sub-function could be installed, it may be desirable to have one library module selected automatically by the system 100 rather than requiring the user to select one. The list of preferred modules may be grouped by function and within a group are listed in the order of preference. In one non-limiting example, the list of preferred modules is optional and is only done for LIB modules and AM software modules, not hardware modules 107. Thus, it is assumed duplicate hardware modules 107 will not exist since they cannot both occupy the same physical space within the manikin 103.

Additionally, or alternatively, the identifying information provided by the SB software module 106 may be related to the display configuration. For example, what vital sign waveforms and numerics are to be displayed for the scenario are provided. This information may be used to configure the simulation display 104 and the display portion of the control panel 105. Whether or not the user is allowed to adjust these vital signs during the scenario is specified in the user controls information. Thus, user controls may be another form of identifying information provided by the SB software module 106. For example, the variables that may not be changed by the user during the scenario are provided. Users may want to change a scenario by manually adjusting parameters (e.g., heart rate, blood pressure, etc.), thus some scenarios may allow manual adjustment, however, others scenarios may not.

Additionally, identifying information provided by the SB software module 106 may be a description of the module 106 that can be displayed to a user in controls, a dialog box, or through a help function, for example. In one embodiment, the "Name" is used to identify the scenario in user menus (e.g., a pick list) in the control panel 105. A short description may also be provided which includes a brief description of the functionality of the software module 106. Additionally, or alternatively, a long description may be provide which may include a pointer to a file that can be of any length and is intended to provide detailed information on the software module 106.

Similar to the identifying information for the SB software module 106, the library modules (LIB modules) may provide a LIB identification (ID) number as identifying information to the system 100. The LIB software module may provide a unique identifier that the system 100 can use to look up module information in the system registry. The ID may include a prefix indicating that the module is a library software module, followed by a manufacturer number joined with a module number and a revision number. A revision number may also be provided to identify different revisions of the same module from the same manufacturer. Thus, manufacturers may be required to provide the module information outlined here for each module they offer.

In some embodiments, the identifying information provided by the LIB software module 106 may be related to the module's function, sub-function, index, and length. Thus, the system 100 can identify the functionality provided by the module. The function may be a general class of capability, such as a heart sound or ECG waveform. The sub-function allows modules to have different capabilities within a particular function. For example, a heart sound may be for a healthy heart or for a variety of diseased hearts. Modules can have multiple functions, such as a sound library that contains heart sounds, ECG waveforms, respiration waveforms, and voice sounds. The index may be an offset specifying the location of a sound or waveform in internal storage for a LIB module that is embedded in a hardware module 107, for example. Using an index helps prevent the need for a file system in the hardware module 107 and provides a simpler and lower cost medical simulation system 100. An index is optional and will not likely be used for LIB modules installed at the system level. The length specifies the length of the file.

Lastly, the identifying information provided by the LIB software module 106 may be related to descriptions of the module that can be displayed to a user in a dialog box, or through a help function. For example, the "Name" may be used to identify the library in user menus. The short description may be a brief description of the functionality, and the long description may be a pointer to a file that can be of any length and is intended to provide detailed information on the module.

Figure 5:
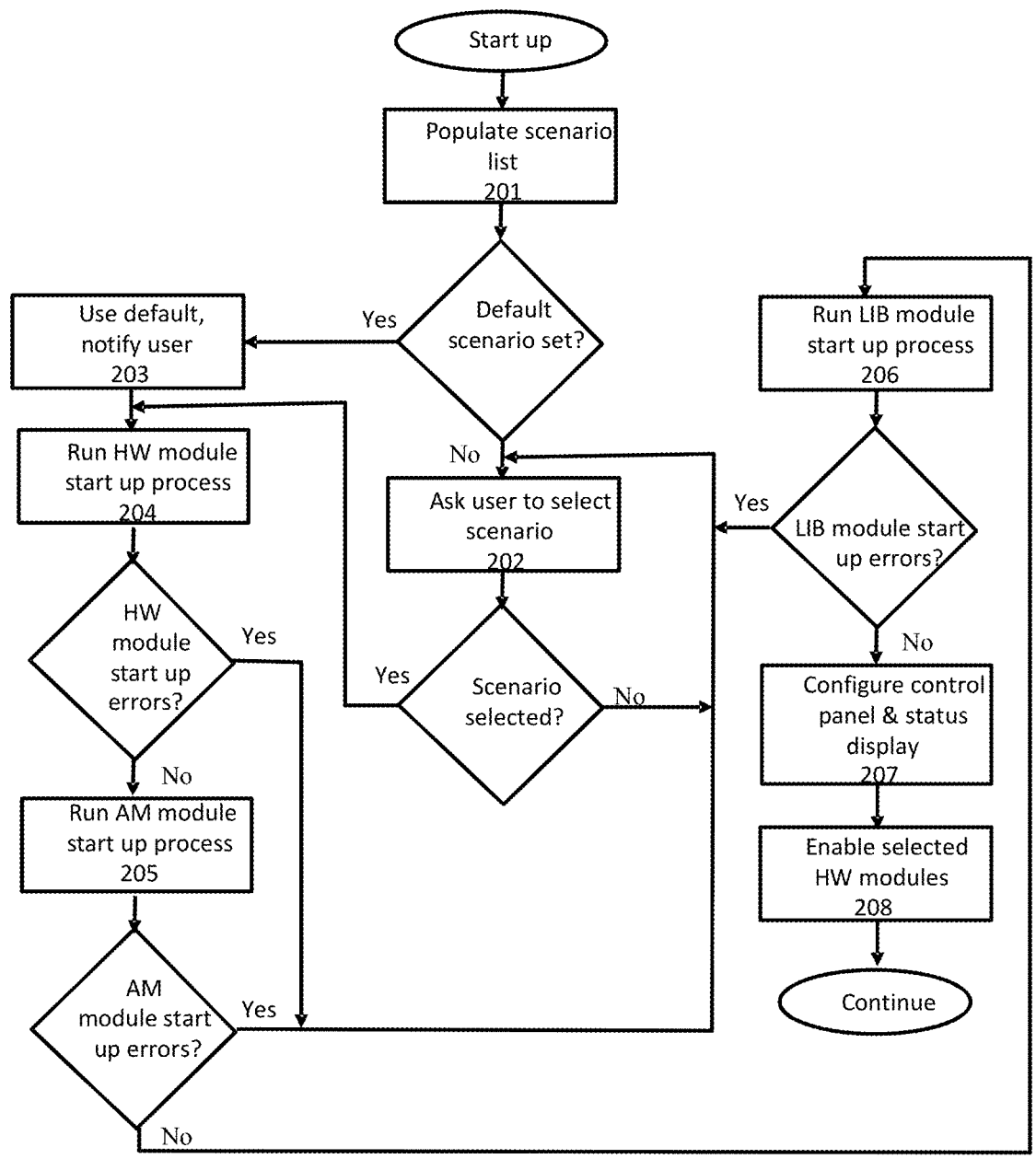

Turning now to FIG. 5, a flow chart of the system 100 startup process that may be performed when the system 100 is turned on is provided. Generally, the system 100 determines what modules are installed, checks the compatibility of the modules, and configures the system accordingly. The startup process varies depending on whether a scenario has been selected or not. At startup, the system 100 places the names of all available scenario-based software modules ("scenarios") into a scenario pick list at process block 201. If a default scenario has not been set, the system 100 asks the user to select a scenario to be run at process block 202 and whether the selected scenario should be set as the default. If a default scenario has been set, that scenario is automatically started at process block 203. Once a scenario is selected, the system 100 runs the hardware module startup process at process block 204. Once any hardware module errors are resolved, the system evaluates any AM software module requirements at process block 205 and evaluates any LIB modules requirements at process block 206 for the selected scenario. If there are no AM software module errors or LIB module errors, the system configures the control panel 105 and simulation display 104 at process block 207 and enables the required/selected modules at process block 208. Only the modules required by the scenario or selected by the user in the advanced hardware module management screen are powered on.

After the start up process is complete, the user can start the scenario or manually operate the system 100. At any time the user can change the scenario from the control panel 105. If a new scenario is selected, the modules are returned to the idle state and the startup process is repeated. If the power is cycled (i.e., turned off then back on) on the control panel 105 or the manikin 103, the startup process is also repeated. A description of the each of the sub-processes, namely, the hardware module startup, the AM module start up, the LIB module startup, and the display and control startup are described below.

Figure 6:
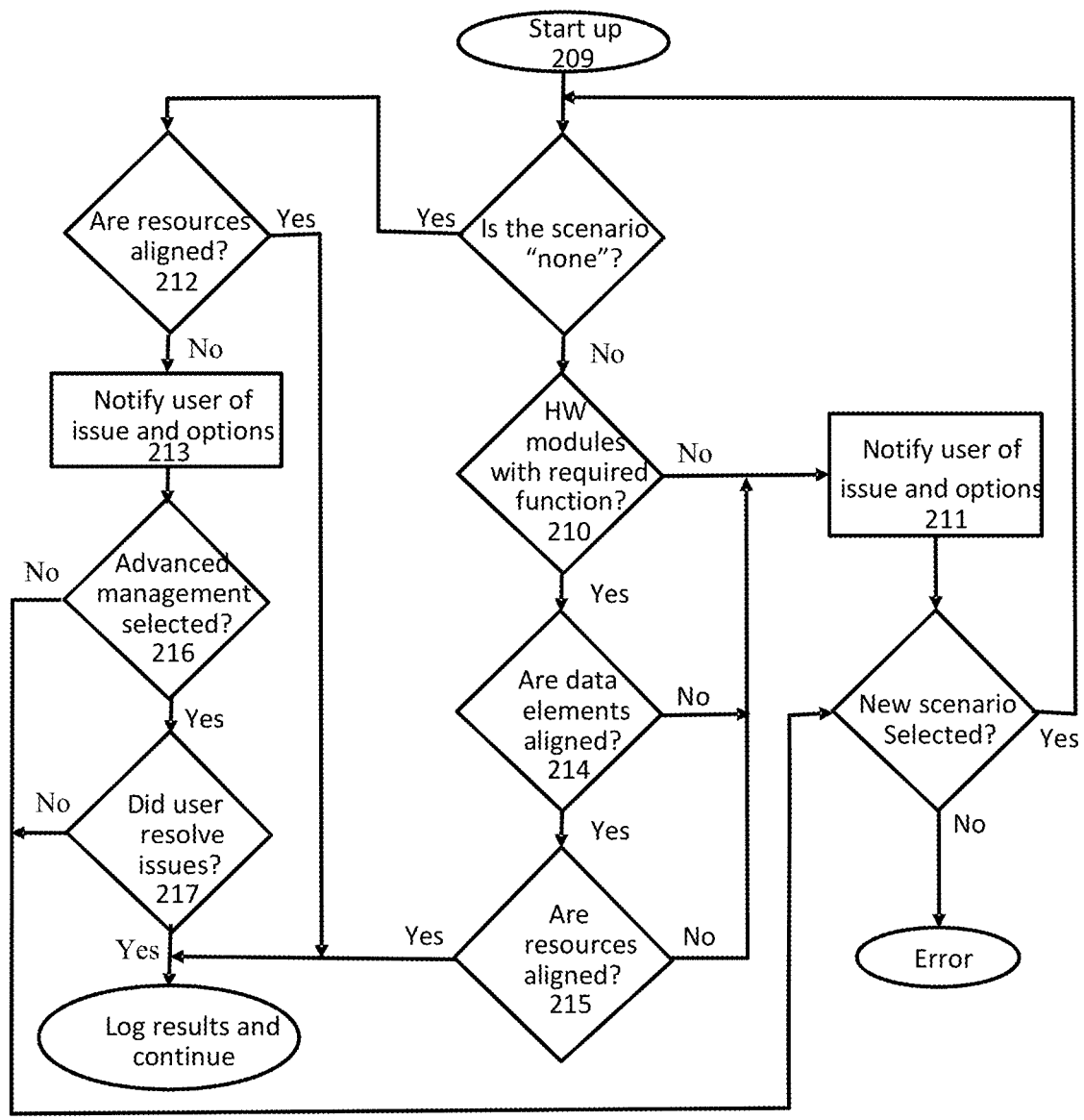
FIG. 6 is a flow chart setting forth the steps of processes for a hardware module startup procedure.

Referring now to FIG. 6, an exemplary embodiment of the hardware module startup process is provided. In this embodiment, the hardware modules startup in a low-power, idle state. At startup, the hardware modules communicate their hardware ID number and location information to the system 100 and remain in the idle state until told to operate at process block 209. The system 100 then looks up the capabilities of the installed modules 107 based on the hardware ID numbers and checks to see that the resources provided are aligned with the resources to be consumed based on the scenario to be run, as shown at process blocks 210, 214 and 215. Assessment of resource balance is based on the modules required for the scenario selected. If the modules required for the selected scenario cannot be supported, or if the required modules are not installed or do not meet the needs of the scenario, the user is notified of the error and is instructed to select another scenario or to contact support at process block 211. There are three types of hardware module errors that can occur. First, if the system cannot provide the resources (e.g., power, fluid, etc.) needed by a module that is required for the selected scenario the user is notified of the error. Second, if a module with the function/sub-function required for the selected scenario is not installed the user is notified of the error. Third, if a module required for the selected scenario is installed but it does not provide the needed parameters, synchronization, or data, for example, the user is notified of the error.

Still referring to FIG. 6, if no scenario is selected (none) then all installed modules are evaluated at process block 212. In this case, a different error message is provided to the user if the modules cannot be supported at process block 213. This error message contains a link to an advanced hardware module management screen at process block 216 for more advanced users where the user is presented with a table showing the deficit in resources and can disable modules to eliminate the deficit. This advanced functionality is provided to allow more advanced users to resolve a resource issue without having to select a scenario or physically change modules as shown at process block 217. Users may want to manually operate the system 100 rather than follow/use a scenario and changing/adding modules may not be an option.

An alternative embodiment of the hardware module startup process may be provided. For example, when the system is started, the hardware modules 107 that draw power from the communication and power bus 111 start up in a low power mode where the processor 108 is active but higher power functions, such as actuator drives, remain off. While in this low power state, the modules identify themselves, and their characteristics including their power consumption requirements, to an arbitrator function running on the computational device 101. The power source 110 also identifies itself and its power sourcing capabilities to the arbitrator function. The arbitrator function checks to see that the power source is capable of powering the installed modules requiring power. If not the user is notified of the issue and options to resolve it. Next the arbitrator function checks for compatibility between installed modules to ensure that the system can be properly operated as setup. This is particularly important if modules are being provided by different vendors. For example a software training application may require/expect a manikin to be able to provide chest motion and lung sounds. Without those capabilities the system would not provide the correct training environment for the user.

Figure 7:
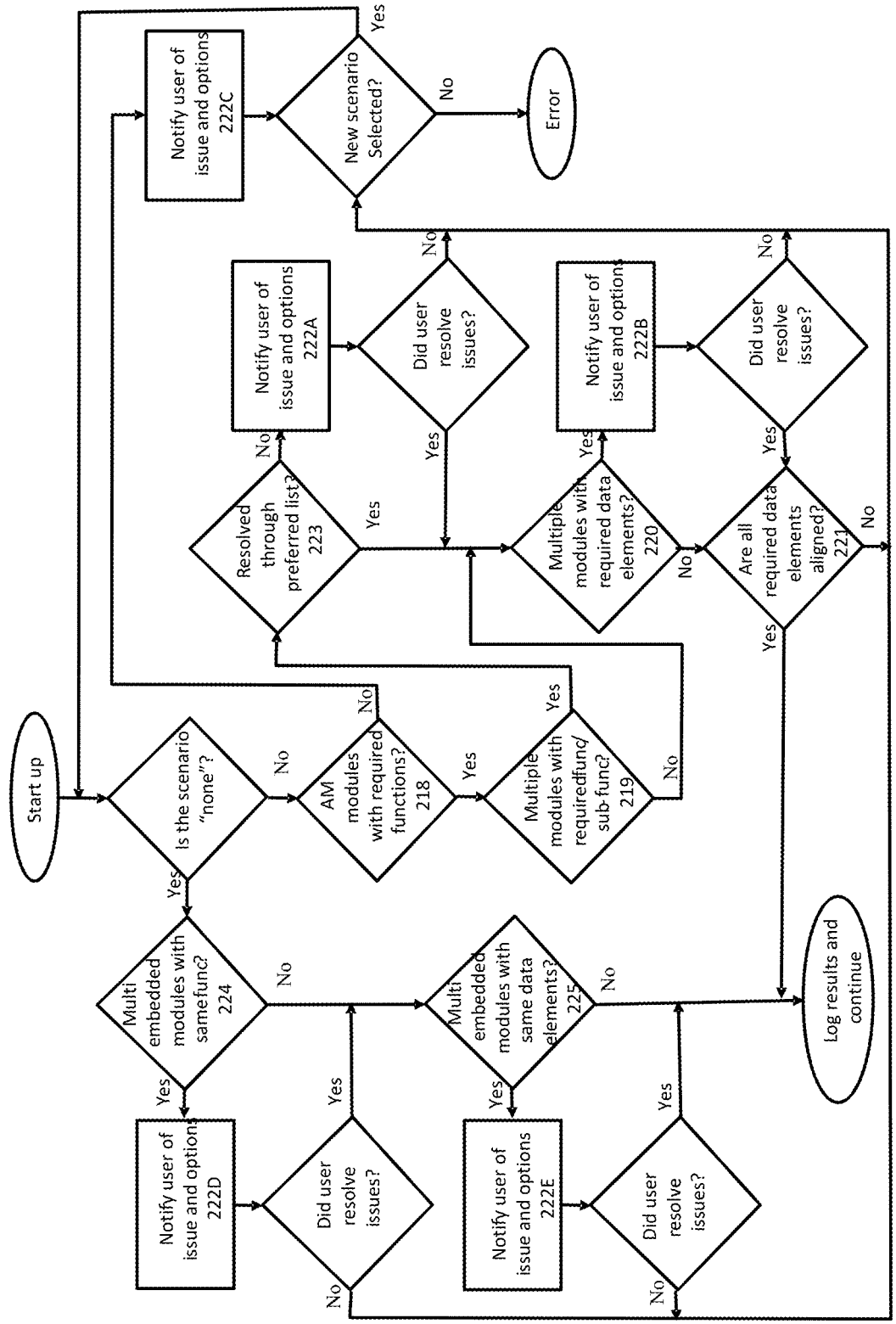
FIG. 7 is a flow chart setting forth the steps of processes for a startup procedure for an algorithm/model software module.

Once any hardware module errors are resolved, as described with respect to FIG. 6, the system 100 evaluates any AM software module requirements. Referring to FIG. 7, an exemplary embodiment of the AM software module startup process is provided. The system looks to see that AM software modules with the required functionality for the selected scenario are available at process block 218 and checks to see that the modules are compatible with the scenario to be run and with each other at process blocks 219, 220, and 221. If the modules required for the selected scenario are not available, do not meet the needs of the scenario, or are in conflict, the user is notified of the error and is instructed to correct the error, select another scenario, or to contact support at process blocks 222A, 222B, or 222C. There four types of AM software module errors that can occur. First, an AM software module with the required function/sub-function for the selected scenario is not installed. Second, a module with the required function/sub-function for the selected scenario is installed, but it does not provide the needed inputs, ranges or sourced data. Third, there are two or more modules installed with the required function/sub-function for the selected scenario. Fourth, there are two or more required modules of different functions that source the same data element(s).

In the case of the first two errors, the corrective action available is to select another scenario or to call support. In the case of two or more modules installed with the same required function/sub-function for the selected scenario, the user has the option of selecting which AM software module to use. Scenarios may also specify preferred AM software modules by their AM ID number. Users are presented with an error message and the ability to manually select which AM software module to use if the conflict cannot be resolved through the preferred module list. In the case of two or more modules of different functions required for the selected scenario that source the same data element(s), the user has the option of selecting which AM software module to use for that data element. Scenarios may also specify preferred AM software modules by their AM ID number. Users are only presented with an error message and the ability to manually select which AM software module data element to use if the conflict cannot be resolved through the preferred module list, as shown at process block 223.

If no scenario is selected (none) then only AM software modules that are embedded in installed hardware modules which are to be activated as a result of the hardware module startup process need to be evaluated as part of the AM software module start up process at process blocks 224 and 225. If the modules are in conflict, the user is notified of the error and is instructed to correct the error, select another scenario, or to contact support at process blocks 222D and 222E. Once any AM software module errors are resolved, the system checks for LIB modules issues. If the power is cycled (i.e., turned off then on) on the control panel 105 or the manikin 103 the startup process is repeated.

Figure 8:
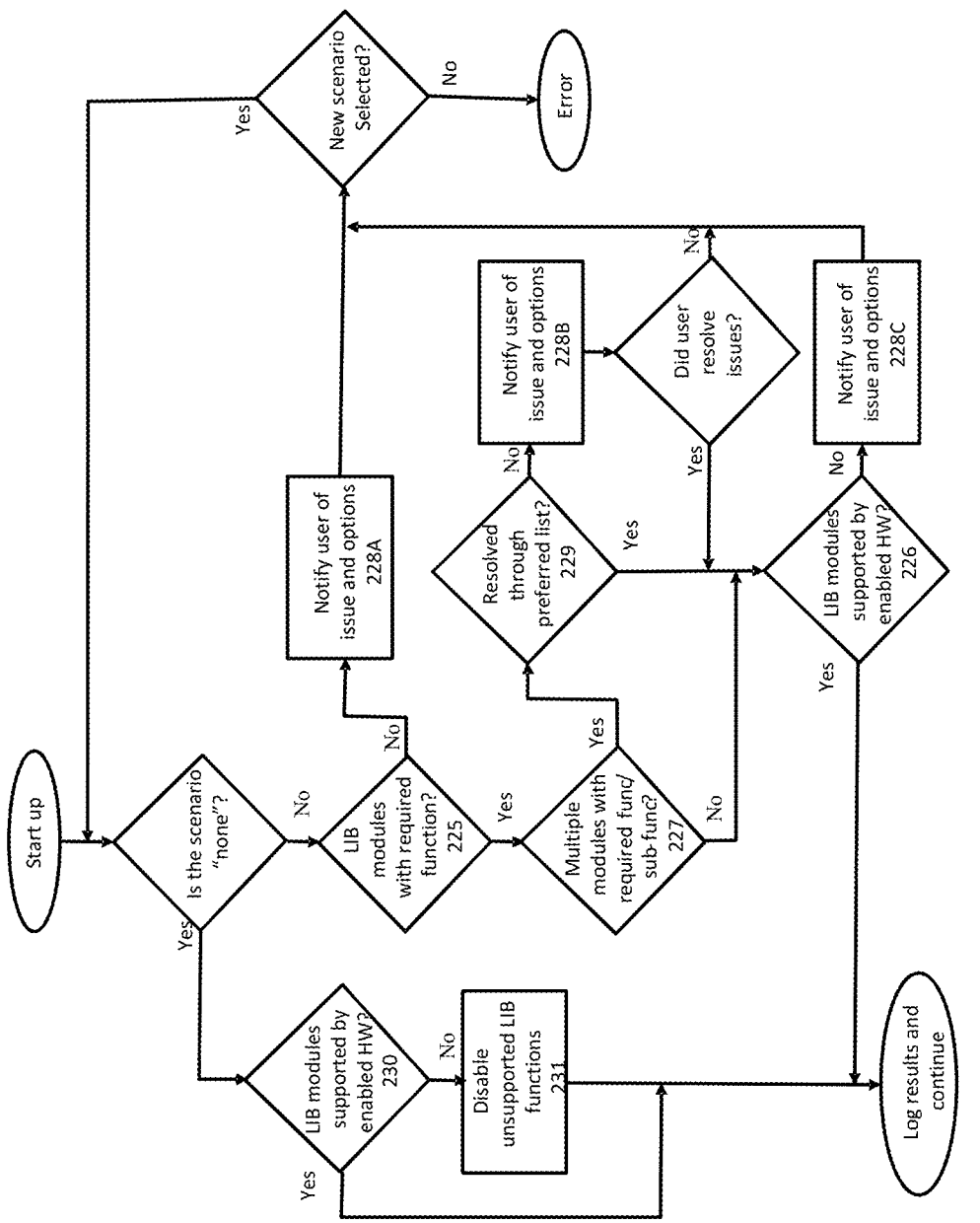
FIG. 8 is a flow chart setting forth the steps of processes for a startup procedure for a library software module.

Referring now to FIG. 8, an exemplary embodiment of the LIB module startup process is provided. First, the system 100 looks to see that LIB modules with the required functionality for the selected scenario are available and checks to see that the modules are compatible with the scenario to be run at process block 225, the installed HW modules at process block 226, and with each other at process block 227. If the modules required for the selected scenario are not available, are not supported by the hardware modules, or are in conflict, the user is notified of the error and is instructed to correct the error, select another scenario, or to contact support at process blocks 228A, 228B, and 228C). There three types of LIB module errors that can occur. First, a LIB module with the required function/sub-function for the selected scenario is not installed. Second, a LIB module with required functionality is installed but there is no supporting hardware module (i.e., no module that supports streaming data) has been flagged for activation. Third, there are two or more modules installed with the required function/sub-function for the selected scenario.

In the first two cases, the corrective action available is to select another scenario or to call support. In the case of two or more modules installed with the same required function/sub-function for the selected scenario, the user has the option of selecting which LIB module to use. Scenarios may also specify preferred LIB modules by their LIB ID number. Users are only presented with an error message and the ability to manually select which LIB module to use if the conflict cannot be resolved through the preferred module list, as shown at process block 229.

If no scenario is selected (none) then all installed LIB modules are evaluated for appropriate supporting HW modules that have been selected for activation at process block 230. All embedded LIB modules and all system level LIB modules with supporting hardware modules that are activated are made available to the user, even if there are duplicate functions and/or sub-functions. Then, at process block 231, all other LIB module functions are disabled. This approach allows the user to have access to the maximum suite of library functions for manual operation. Once any library module errors are resolved, the system 100 configures the control panel 105 and simulation display 104. If the power is cycled (i.e., turned off then on) on the control panel 105 or the manikin 103, the startup process is repeated.

Figure 9:
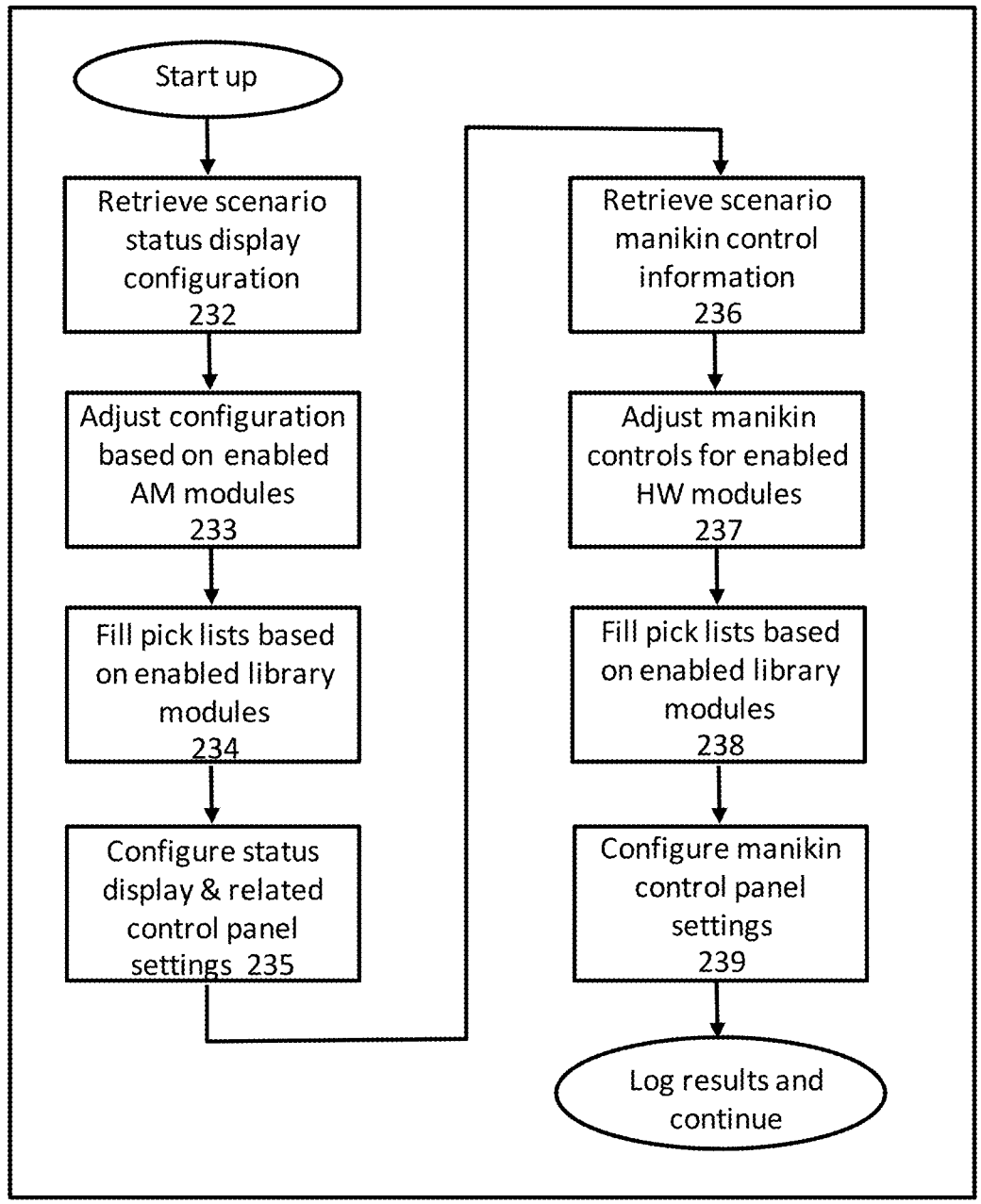
FIG. 9 is a flow chart setting forth the steps of processes for a startup procedure for a display and control of the medical simulation system.

Referring now to FIG. 9, an exemplary embodiment of the display and control startup process is provided. The configuration for the simulation display 104 and the display section of the control panel 105 at process block 235 are determined by the display configuration information provided by the selected scenario at process block 232 and 236. Whether or not the user is presented with controls to change the waveforms and numerics manually is determined by two factors. First, the user control information provided by the selected scenario, and, second, the user control information provided by any selected AM software modules. Only controls that are not blocked by either the selected scenario or AM software modules are shown on the control panel display at process block 233. The selections available to the user in the controls that are available (e.g., via a pick list) are determined by the related functions found in the selected LIB modules at process blocks 234 and 238. For example the pick list presented to the user for an ECG waveform would be determined by the available ECG wave types in the selected LIB module(s) that contains ECG waveforms.

The user is free to modify the simulation (i.e., status) display 104 and the display section of the control panel 105 in ways not restricted by the selected scenario or AM software module(s). For example, a scenario that does not specify the display of a respiration waveform, but uses a LIB module that has respiration waveforms, can be modified by the user to show a respiration waveform. The configuration for the manikin control section of the control panel at process block 239 is determined by two factors. First, the user control information provided by the selected scenario, and, second, the controls supported by the activated hardware modules. Only controls not blocked by the selected scenario and supported by activated hardware modules are provided at process block 237.

Figure 10:
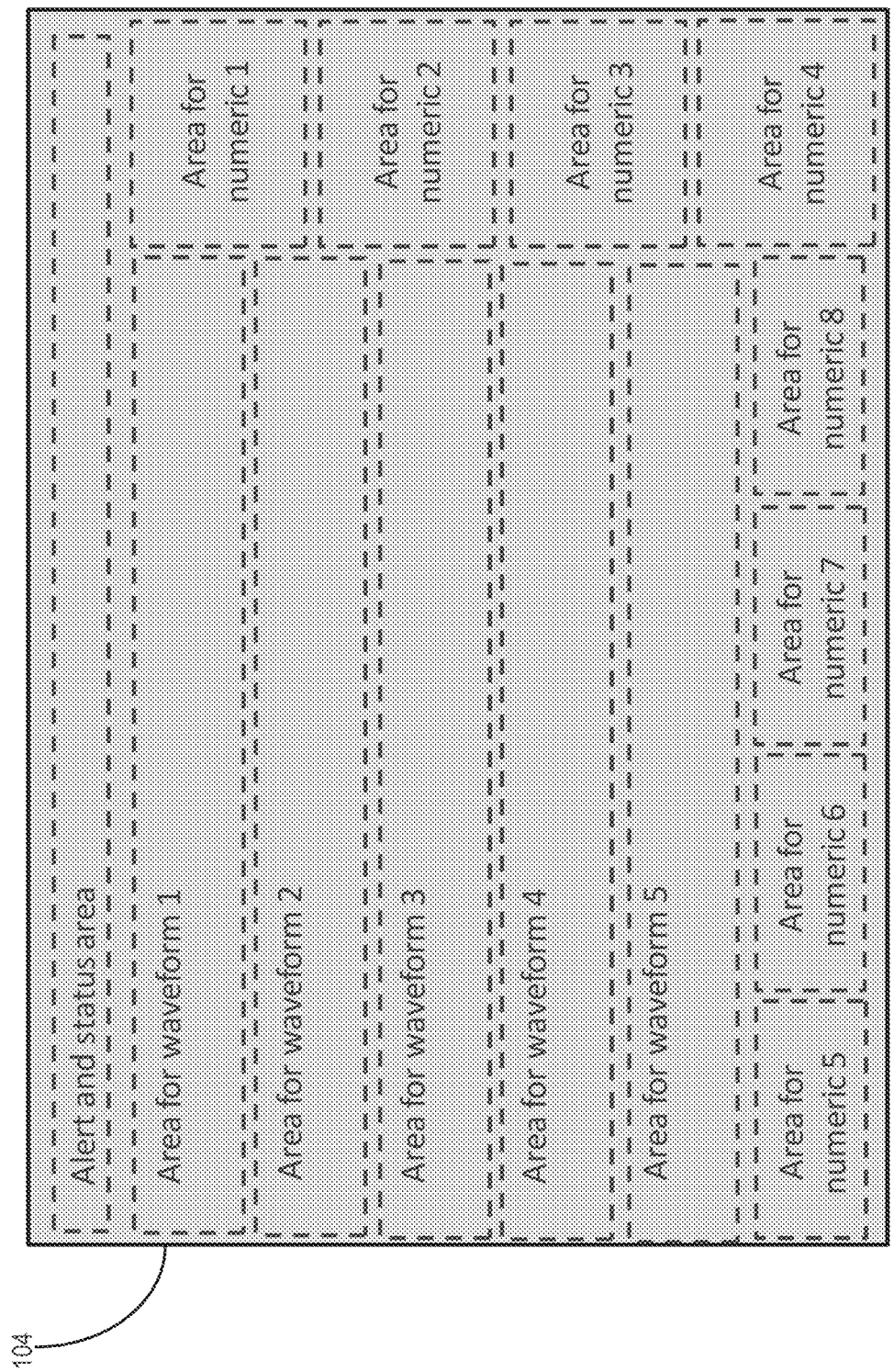
FIG. 10 is a schematic view of an exemplary screen layout for a simulation display of the medical simulation system.
Figure 11:
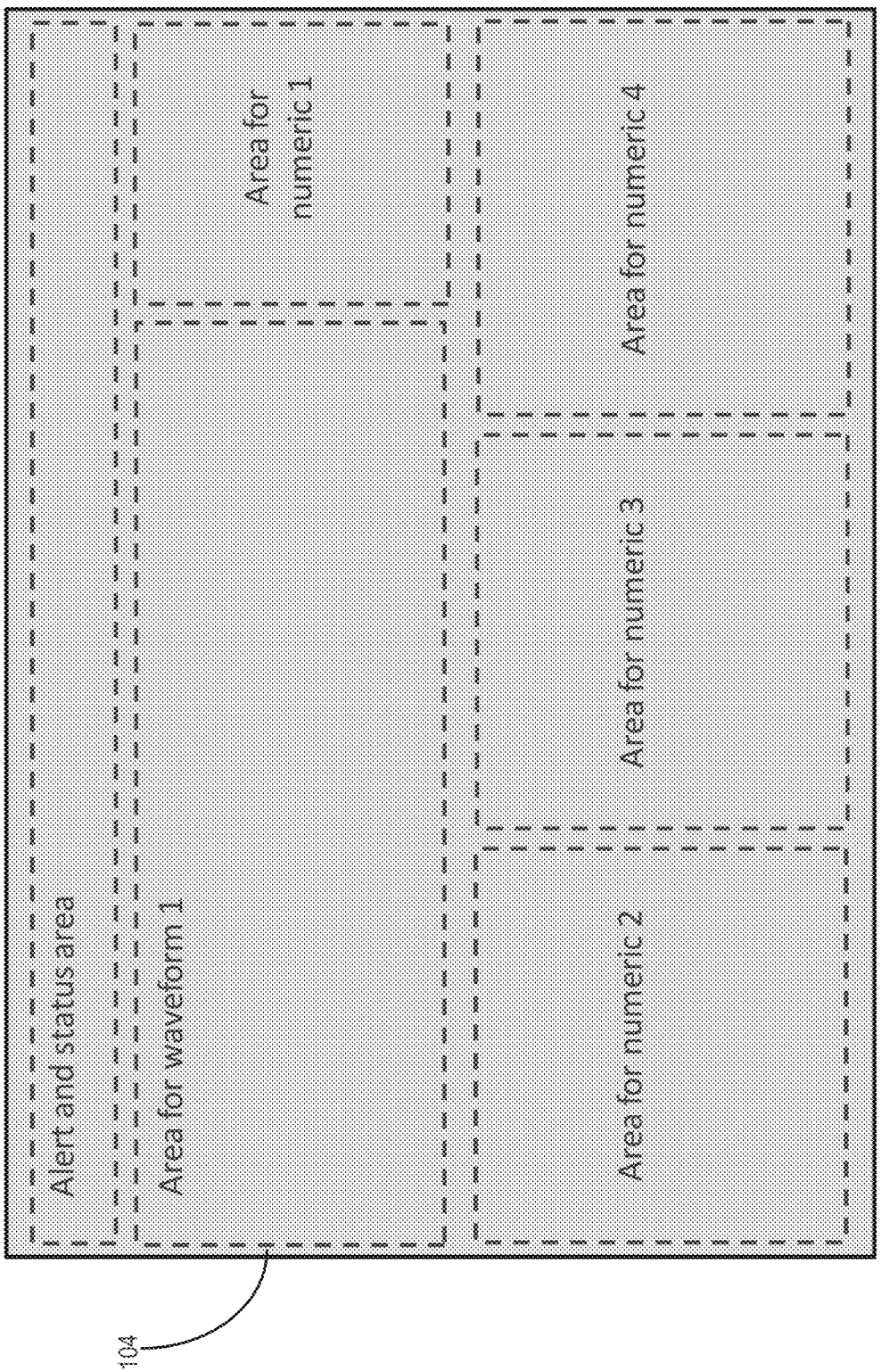
FIG. 11 is a schematic view of another exemplary screen layout for the simulation display of the medical simulation system.

Referring now to FIGS. 10 and 11, example embodiments of screen layouts for the simulation display 104 is provided. The simulation display 104 may be capable of displaying a variety of physiologic waveforms and numerics. For example, FIG. 10 shows an example of a layout with areas established for five waveforms and eight numerics and FIG. 11 shows an example with a reduced number of areas for waveforms and numerics. The system 100 automatically configures the simulation display to optimize the use of the screen area and to minimize confusion for the user. Only two versions of the layout are shown in this embodiment but many options are possible which could be determined by an algorithm that calculates needed space and arranges items according to a set of rules.

The simulation display 104 may mimic a conventional patient monitor display for communication of vital signs and "patient" status, for example. The simulation display 104 may be configured to provide physiological data to the user that includes, but is not limited to, waveforms, such as ECG traces, arterial blood pressure (ABP) traces, pulmonary artery pressure (PAP) traces, and pleth (pulse) traces. The simulation display 104 may also be configured to provide numerical physiological data including, but not limited to, heart rate, systolic and diastolic blood pressure, respiration rate, $SpO_2$ value, pulmonary artery pressure (PAP), central venous pressure (CVP), pulmonary capillary wedge pressure (PCWP), and $EtCO_2$. Additionally, the simulation display 104 may be configured to provide audible sounds to the user, such as a QRS beep, a $SpO_2$ tone, and an alarm tone.

Figure 12:
FIG. 12 is a schematic view of the exemplary screen layout for the simulation display of FIG. 12 that is populated with data.

For example, as shown in FIG. 12, an example embodiment of the simulation display 104 of FIG. 11 that is populated with data is shown. The usage of screen space is optimized and blank waveform and numeric fields are eliminated to prevent the user from thinking that data is missing and/or that something might be wrong with the system 100, for example.

Figure 13:
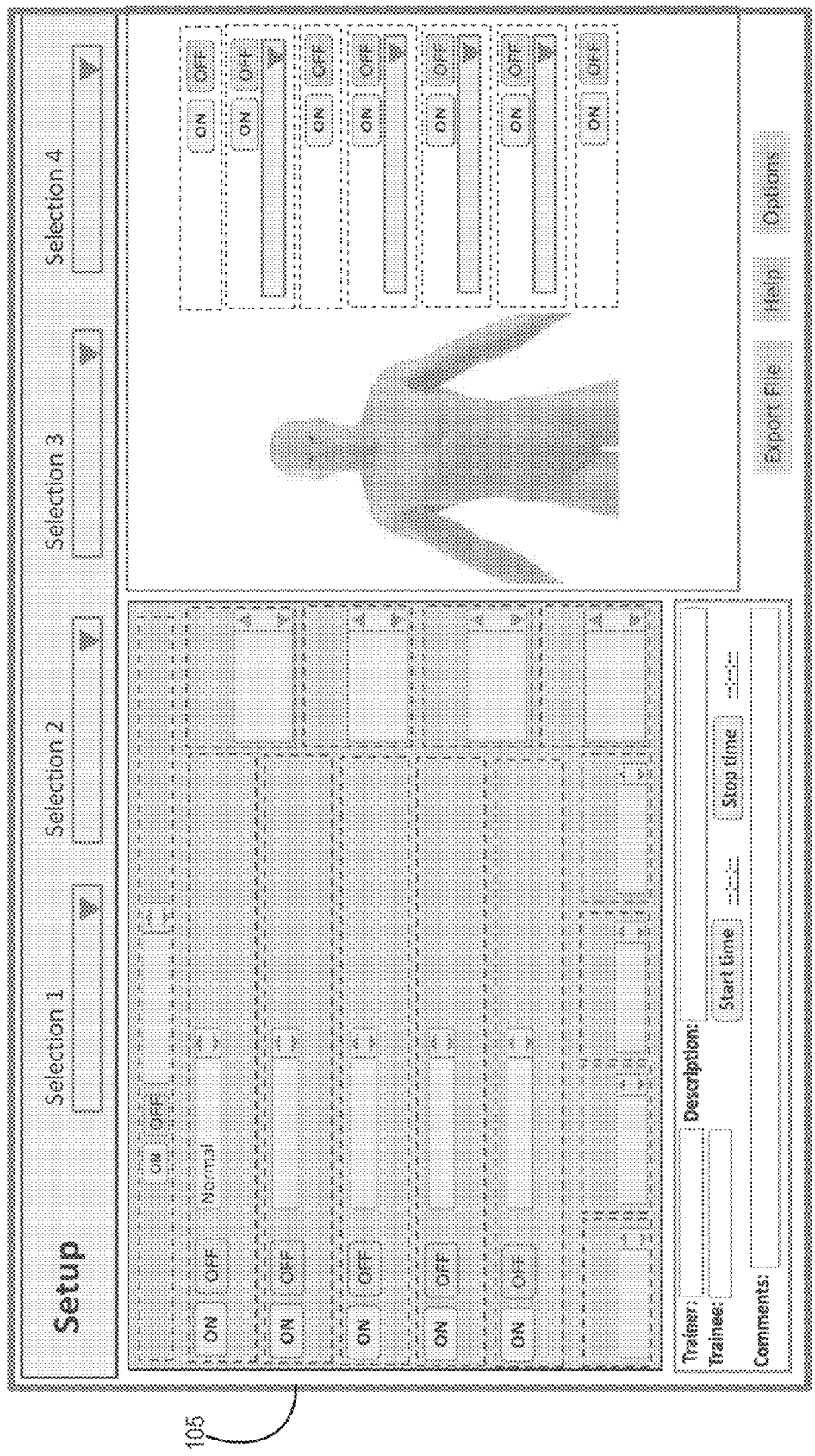
FIG. 13 is a schematic view of an exemplary screen layout for a control panel of the medical simulation system.
Figure 14:
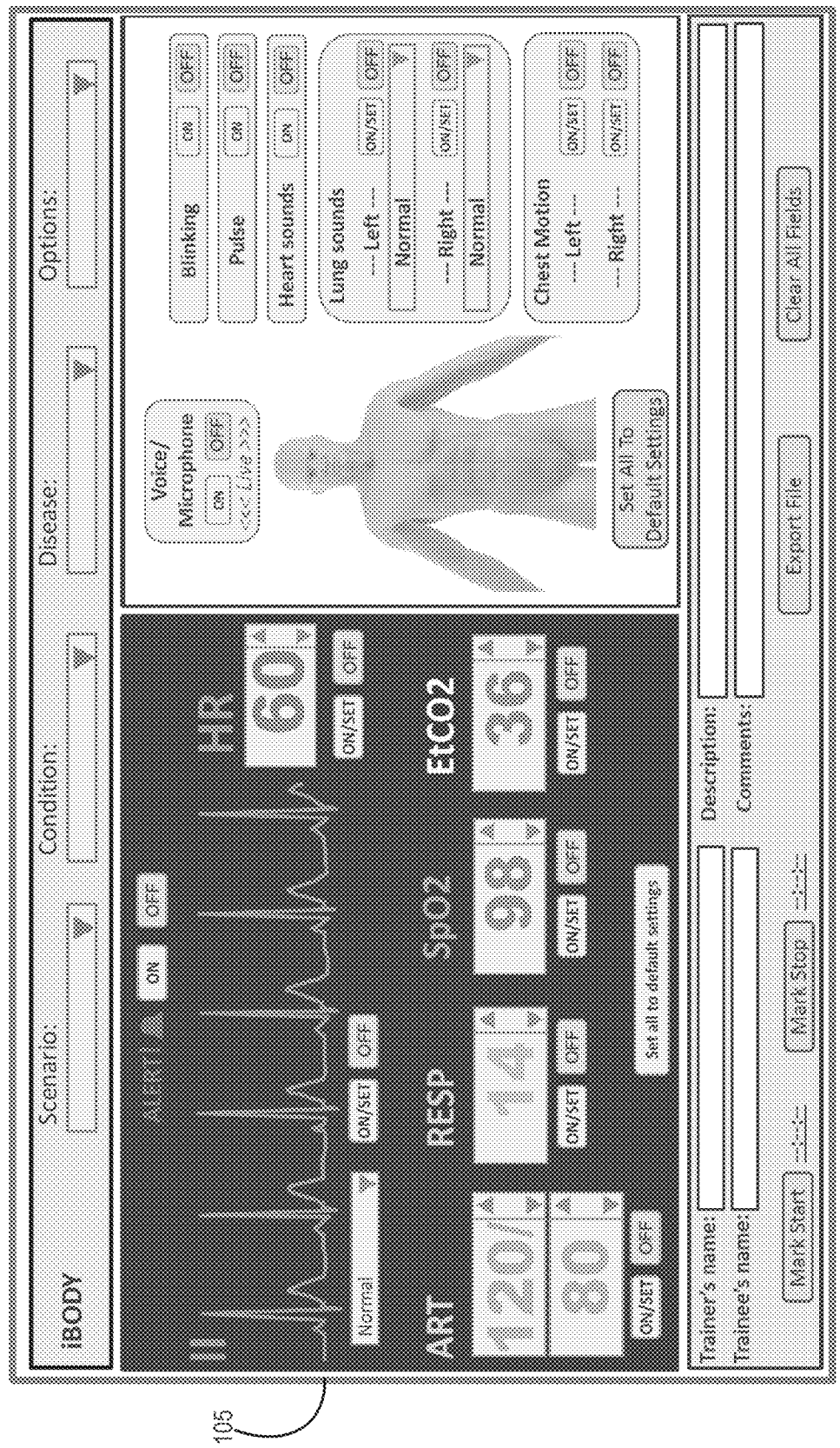
FIG. 14 is a schematic view of another exemplary screen layout for the control panel of the medical simulation system.

Referring now to FIG. 13, an example embodiment of a layout for a control panel 105 is shown. The control panel 105 is used by a trainer to control and document the simulation experience. There are three main sections to the control panel including a control and status view of the simulation display, a control and status view of the manikin, and documentation of the training. Additionally, the control panel 105 may include controls for changing the setup for a training session or controls for what is shown on the simulation display 104. In addition, the control panel 105 may include control of manikin functions and inputs for documentation of a training session, for example. Whether or not each of these sections appears and what controls are available in them is determined by the startup process outlined above. FIG. 14 shows a control panel 105 populated with data. Only controls for features that installed are shown so that the user is not confused about what the system can and cannot do.

As just described, the control panel 105 may be utilized by the trainer to control and document the simulation experience. The control panel 105 may be configured to provide user controls for the user or trainer that include, but are not limited to, the ability to set heart rate, set respiration and breathing rate, turn off respiration to simulate apnea, select wheeze, rales/crackle, and absent for lung sounds, the ability to control separate (i.e., left and right) lung sounds and heart sounds, set systolic and diastolic blood pressure, set $SpO_2$ value, set $CO_2$ value, turn pulse on and off, set PAP systolic and diastolic pressure, set CVP, ability to turn ABP trance on and off, ability to turn PAP trace on and off, on/off control for rise and fall of chest, turn eye blinking on and off, ability to turn alarm sounds on and off, ability to separate on/off controls for right and left chest motion, set tongue edema, set laryngospasm, set airway resistance, provide microphone for voice inputs with on/off control, provide an input for trainee name, trainer name, and type of simulation, provide start and stop flags to record start time and stop time, ability to select from a list of arrhythmias, and control to create and export a training file. In addition, the control panel 105 may be configured to provide synchronization of functions. For example, the control panel 105 may be able to synchronize lung sounds and chest rise and fall with respiration rate. Alternatively, the control panel 105 may be able to synchronize an ECG trace, heart sounds, and pulse with heart rate. Further, the control panel 105 may be able to synchronize Korotkoff sounds with systolic and diastolic blood pressure values and applied cuff pressure. Lastly, the control panel 105 may be able to synchronize ABP trace, PAP trace, and pleth (pulse) trace with ECG trace.

Figure 15:
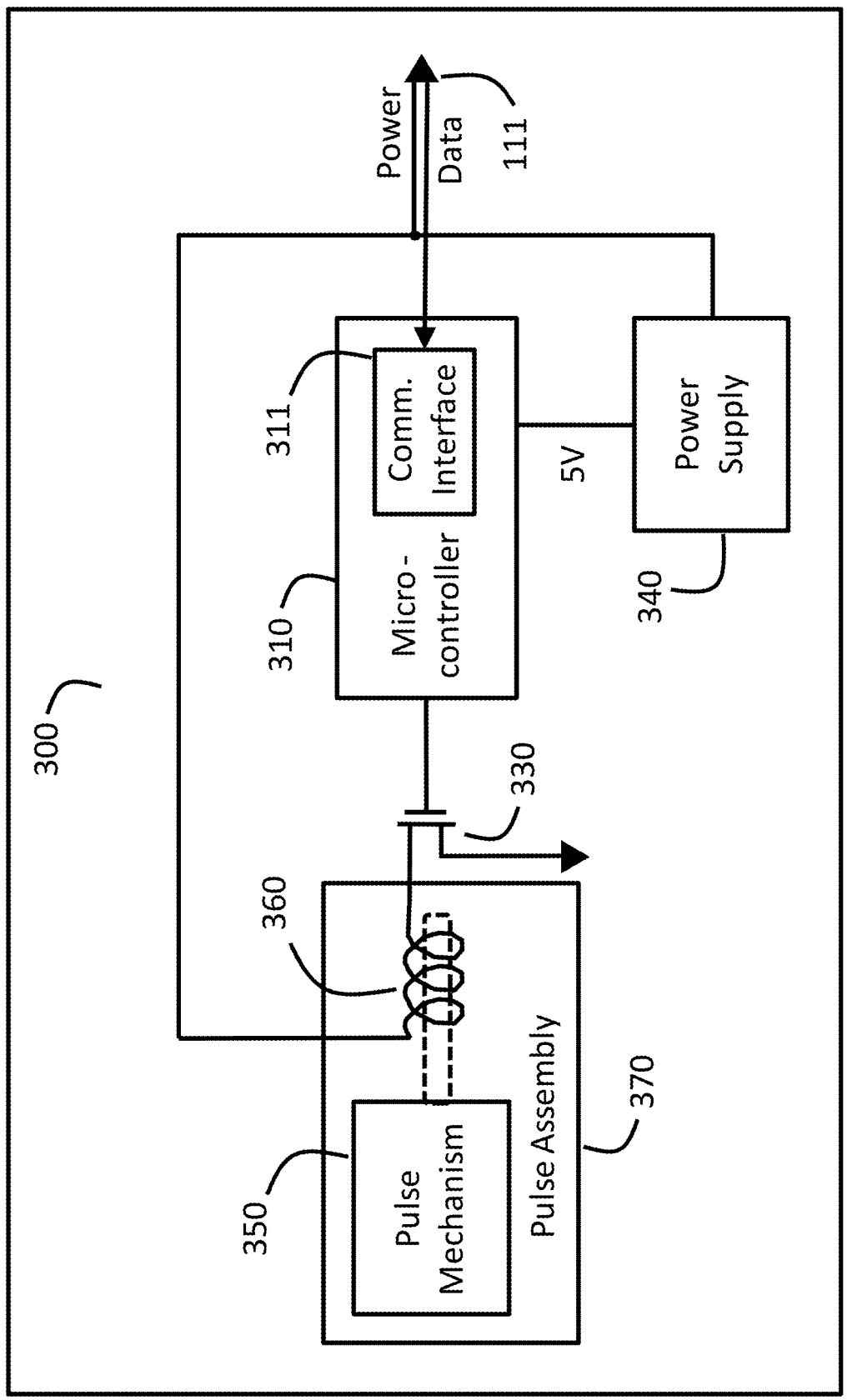
FIG. 15 a block diagram of one embodiment of a hardware module in the form of a pulse module including a pulse assembly for use in medical simulation system.
Figure 16B:
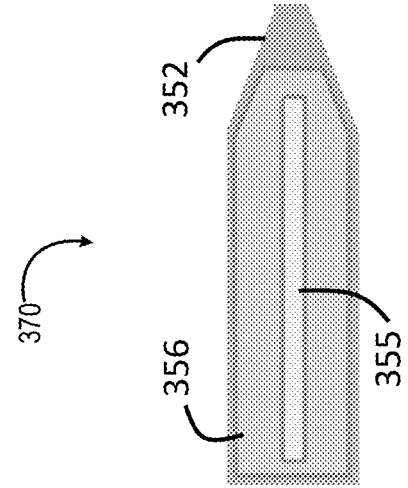
FIG. 16B is a top perspective view of the pulse assembly of FIG. 16.
Figure 16D:
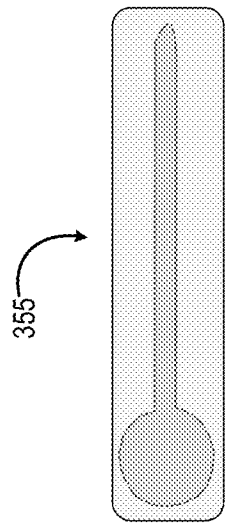
FIG. 16D is a top perspective view of the bladder of FIG. 17C.
Figure 16A:
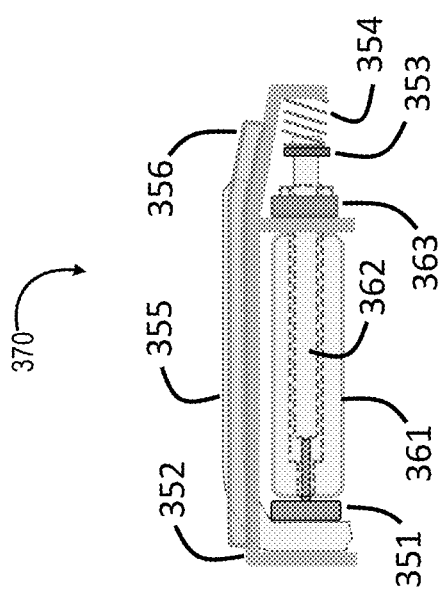
FIG. 16A is a side perspective view of the pulse assembly of FIG. 16.
Figure 16C:
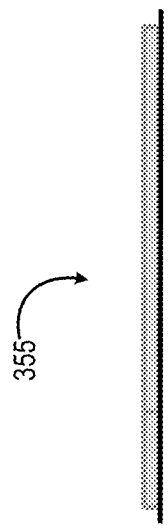
FIG. 16C is a side perspective view of a bladder of the pulse assembly of FIG. 16.

Turning now to FIG. 15, a block diagram of one embodiment of a hardware module 107, in the form of a pulse module 300 for use in medical simulation system 100 is shown. In this embodiment, a microcontroller 310 has an embedded communication interface 311 that communicates over the communication and power bus 111. A power supply 340 regulates the voltage supplied by the communication and power bus 111 (e.g., 24V) to the voltage required for microcontroller 310 (e.g., 5V). In response to commands received over the communication interface, microcontroller 310 drives a transistor 330 to actuate a pulse assembly 370. The pulse assembly 370 contains a solenoid 360 that actuates pulse mechanism 350 which in turn generates a palpable pulse.

As shown in FIGS. 16A through 16D, detailed views of one embodiment of the pulse assembly 370 of FIG. 15 are provided. In this embodiment, the solenoid body 361 of the solenoid 360 is attached to the frame 352 with a nut 363. An actuator 351 passes through an opening in the base of solenoid body 361. The length of the pin on the actuator 351 is such that it positions a plunger 362 a short distance from the bottom of the channel in the solenoid body 361 when the actuator 351 is against the base of solenoid body 361. A bladder 355 is attached to the top surface of the frame 352 and passes through an opening near the end of the frame 352 where it rests between the end of the frame 352 and the actuator 351.

The bladder 355 is constructed of a flexible plastic material and contains a cavity that is partially filled with a fluid such as water. The plastic used to construct bladder 355 is compliant and easily flexes/collapses, but has limited elasticity. The cavity in bladder 355 is partially filled with a fluid such that the cavity is partially collapsed and is mostly free from air pockets. The fluid in bladder 355 can be moved within the cavity by pressing on one area causing the fluid to move to another area and expand the partially collapsed bladder in the area.

When the solenoid 360 is energized, the plunger 362 exerts a force on the actuator 351 causing the actuator 351 to compress the circular area of the bladder 355 which forces fluid to move into and expand the tubular area of the bladder 355. This motion creates the feeling of a pulse on a finger placed on the tubular area. When the solenoid 360 is de-energized, the fluid returns to the circular area due to forces from the bladder and/or the user's finger. To inhibit noise from the plunger 362 knocking into the actuator 351, the two parts are held in contact with a light spring force. A snap ring 353 fits within a groove near the end of the plunger 362. A small spring 354 is placed over the end of the plunger 362 such that it rests against the snap ring 353 and the end of the frame 352. To create a more natural feeling for the user, a cushion 356 is placed around the tubular area of the bladder 355 on the top of the frame 352.

Figure 17:
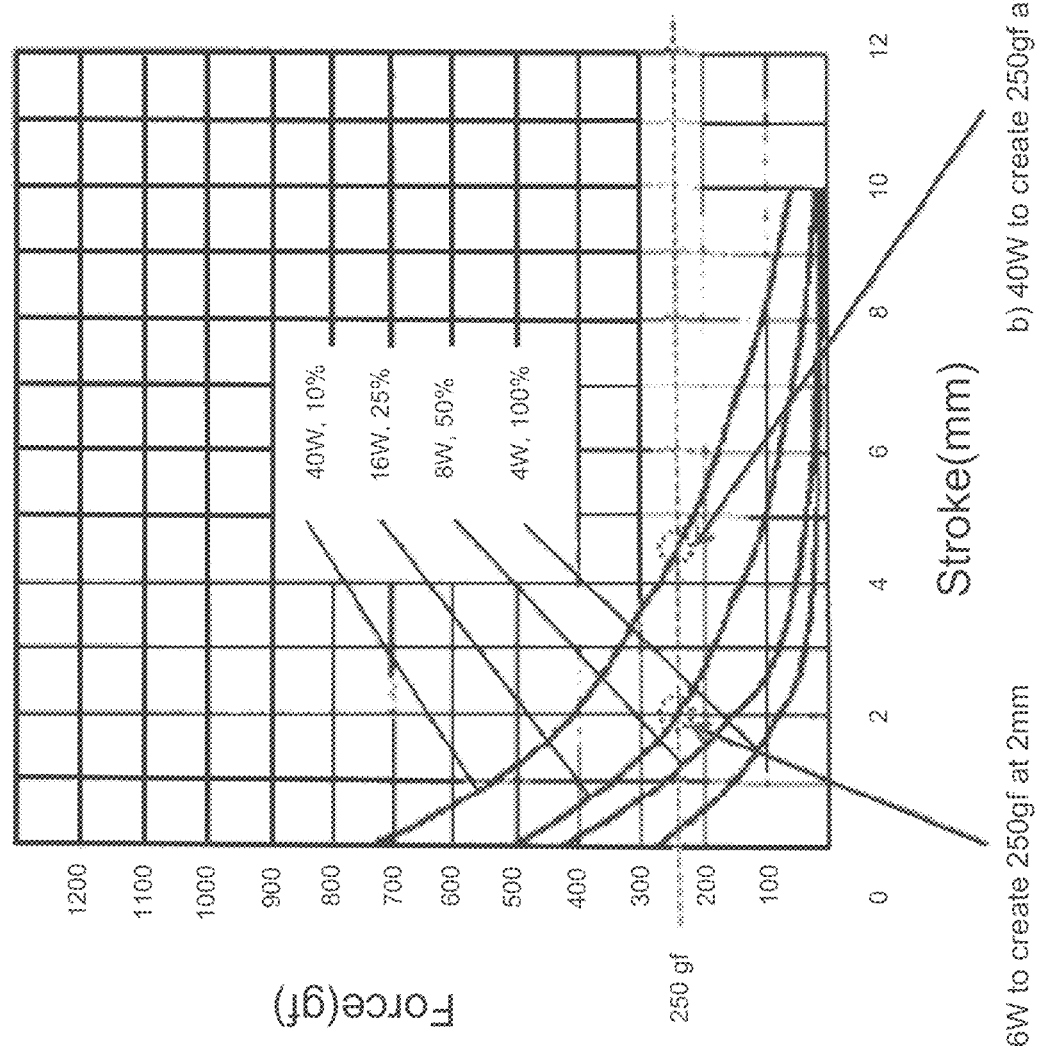
FIG. 17 is a graph representing force curves showing the efficiency of solenoids over various length strokes.

Using a compliant/flexible bladder 355 that is partially filled with fluid provides for an energy efficient design, such that energy is not used to stretch an elastic material such as occurs with techniques that use silicone tubing. Therefore, the solenoid 360 can be used in a more efficient range of motion since the stroke required is short. Typically, solenoids are inefficient at long strokes as shown the graph in FIG. 17. Using a non-compressible fluid versus a gas and a flexible material for the bladder, rather than an elastic material, allows for a design with a short stroke and is thus more efficient. This design also creates a more realistic feeling pulse than designs that use a solenoid to push on a solid/firm mechanical element. The fluid filled, compliant tubing feels more like an actual artery. In addition the solenoid 360 can be driven with a pulse-width modulated signal to "shape" the force curve to better simulate a pulse. Since the module is operated by a microcontroller, the module can automatically adjust the shape of the force curve without burdening the control panel or other system resources.

Many of the physiological functions simulated in a medical simulator are driven by a single parameter such as heart rate or respiration rate. For example, heart rate determines how an ECG trace is displayed, when heart sounds occur, and when a pulse should happen. To maximize the reality of a simulation, these functions want to be synchronized so they not only occur at the correct rate, but also at the correct moment in time. This can be accomplished by having the control panel 105 send a heartbeat trigger message to the other system 100 components. The components then create the desired simulation at the appropriate time.

Figure 18:
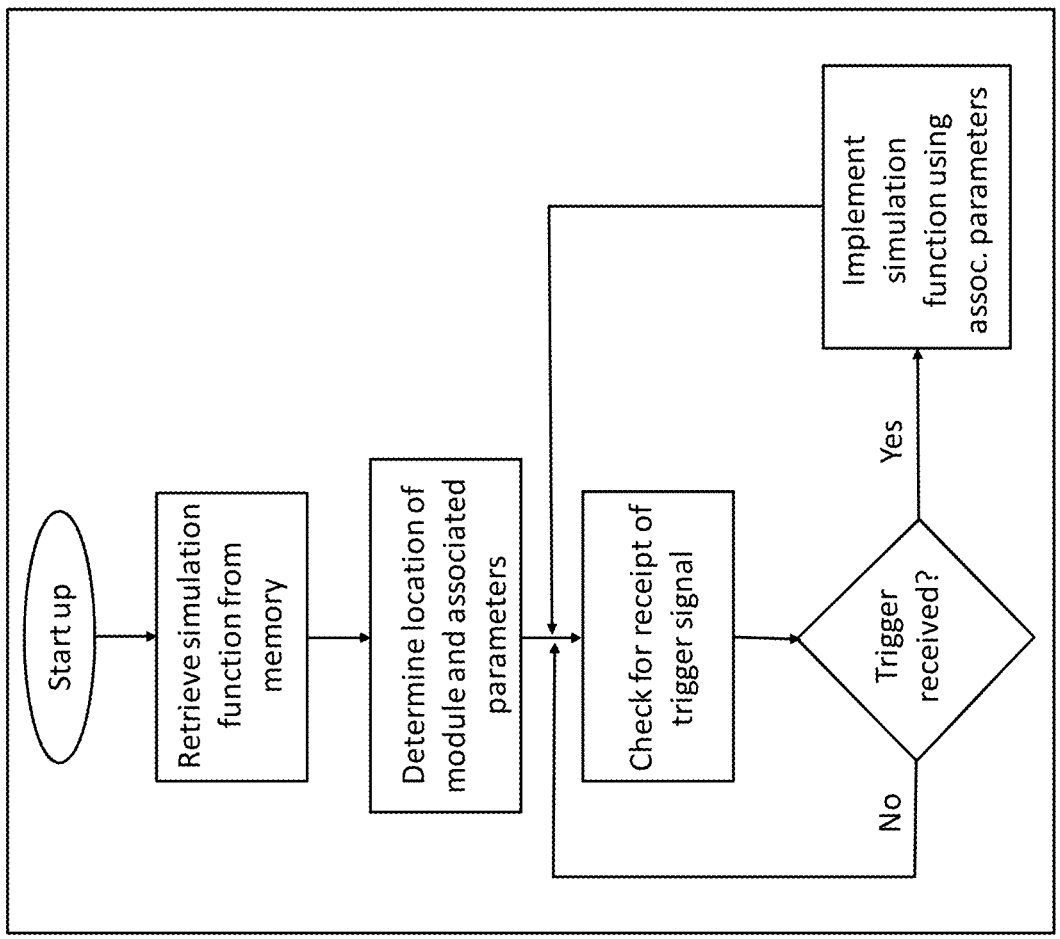
FIG. 18 is a flow chart setting forth the steps of processes for receiving a trigger message from the medical simulation system.

More specifically, as shown in the process diagram in FIG. 18, upon receiving a trigger message, some components may create the desired simulation immediately such as displaying an ECG complex, while others may delay the simulation to better match human physiology. For example, a femoral pulse is delayed from the heartbeat due to the transit time of the pulse going through the arteries. To exhibit this type of behavior, the components need to know their function and location in the simulation system 100. The same function may behave differently depending on its location. For example, a pulse module located in the neck to simulate a carotid pulse will have a different delay than a pulse module located in the groin to simulate a femoral pulse. The location of the module can be preprogrammed into the module prior to installation or the location can be "read" by the module based on a characteristic of the connector in that location, such as the resistance value between two pins on the connector.

Figure 19:
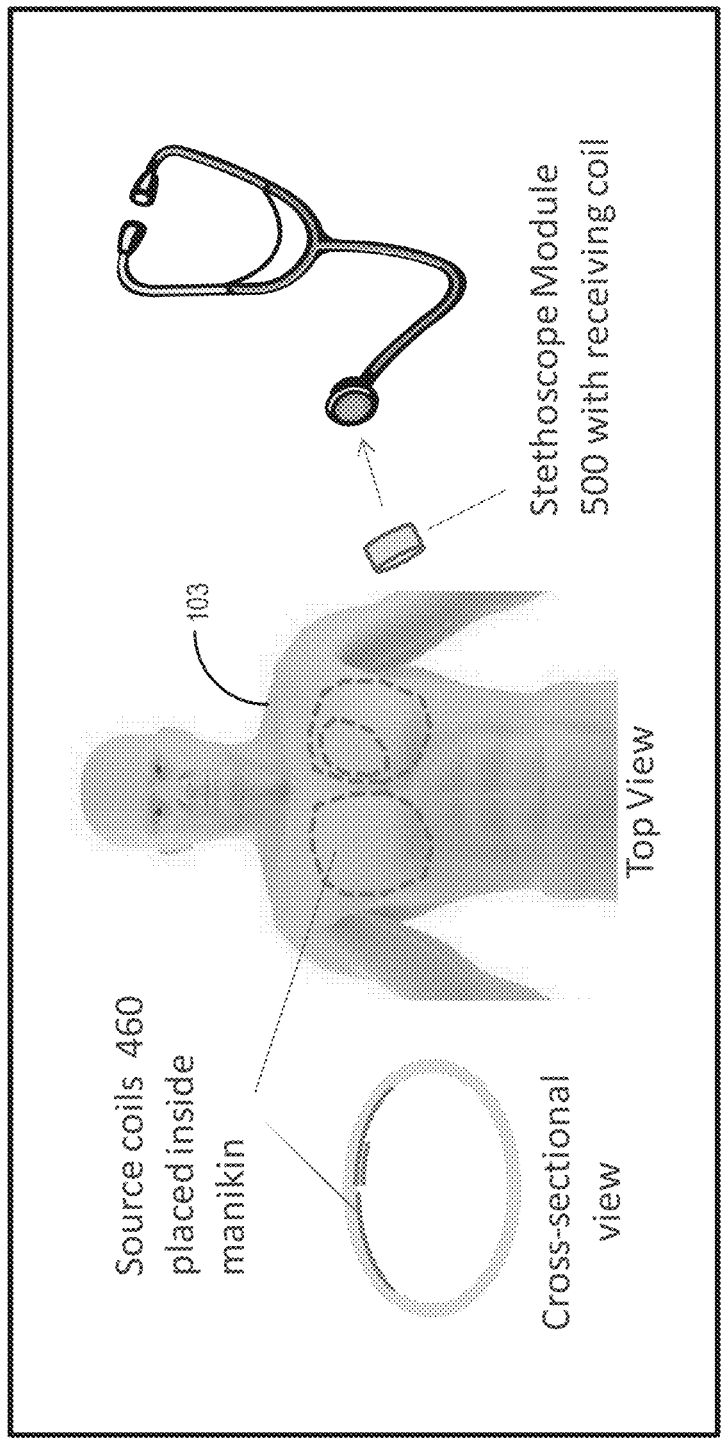
FIG. 19 is a schematic diagram of one embodiment of a hardware module in the form of a body sound simulator for use in medical simulation system.

Turning now to FIG. 19, a diagram of another embodiment of a hardware module 107, in the form of a body sound simulator module for use in the medical simulation system 100 is shown. The sound module contain source coils 460 that approximate the outline of the lungs and heart that are placed on the interior surface of the manikin 103. The source coils 460 are driven with audio signals of lung and heart sounds by a sound module PC board (not shown). A small electronic device, such as a stethoscope module 500 containing a coil, picks up the signals through magnetic coupling when the device is placed in the appropriate locations on the manikin 103. The magnetically coupled signal is amplified and used to drive a small speaker in the stethoscope module 500. The stethoscope module 500 is attached to the bell of a stethoscope which transmits the sound from the small internal speaker to the user.

Figure 20B:
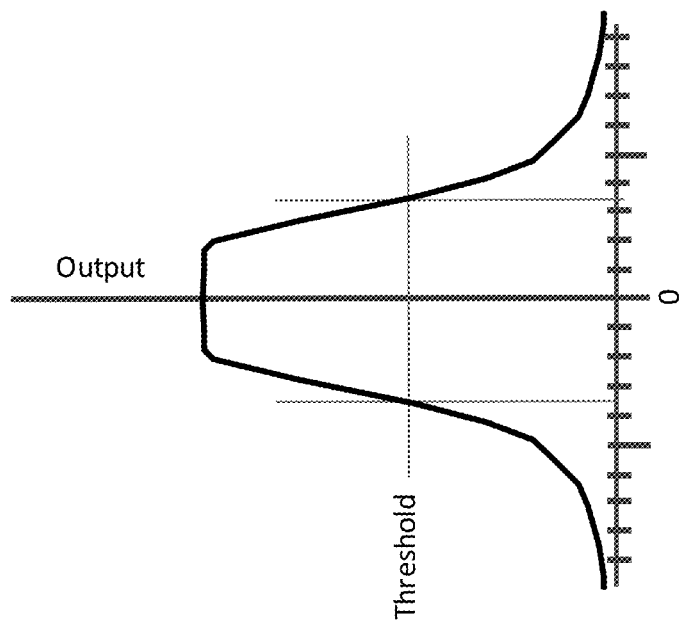
FIGS. 20A and 20B are graphs displaying a flux density generated by a source coil of a body sound simulator relative to a pick-up coil.
Figure 20A:
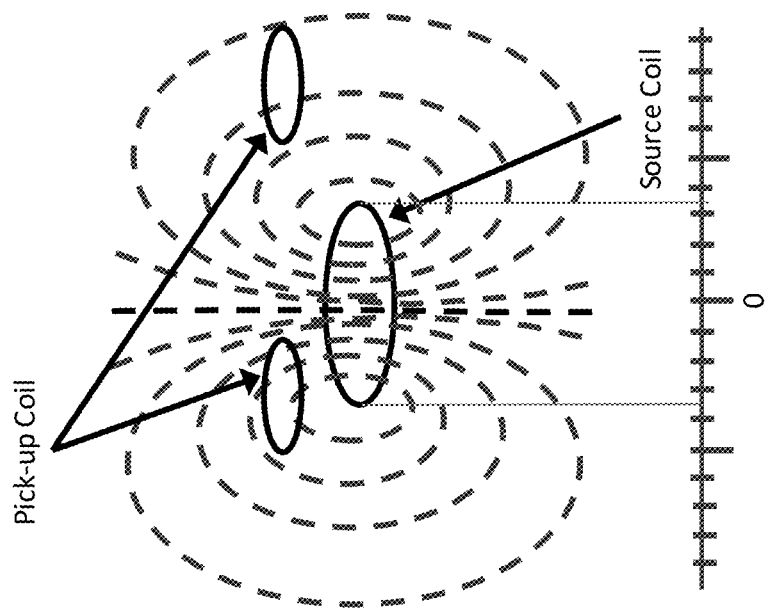

The flux density generated by the source coil 460 is higher inside the coil than outside the coil as shown in FIGS. 20A and 20B. A pick-up coil located near the source coil 460 will produce a larger signal as the pick-up coil is moved closer to the source coil 460. Once the leading edge of the pick-up coil crosses the outside edge of the source coil 460, the output signal from the pick-up coil increases quickly and reaches a peak that is maintained until the pick-up coil passes the far edge of the source coil 460. Thus, a user listening through a stethoscope that is attached to the stethoscope module 500 will hear the appropriate sounds as the stethoscope is moved around the surface of the manikin 103.

Referring back to FIG. 19, the source coils 460 can be constructed of copper magnet wire, for example, that can be formed in the shape of organs, such as the heart or lungs, creating a realistic sound field. The source coils 460 can also be nested (i.e., placed inside of one another) allowing multiple sounds to be combined. For example, a coil in the shape of a heart could be used to create generic heart sounds and a smaller coil placed inside the heart coil could be used to create a localized and specific valve sound.

Figure 21:
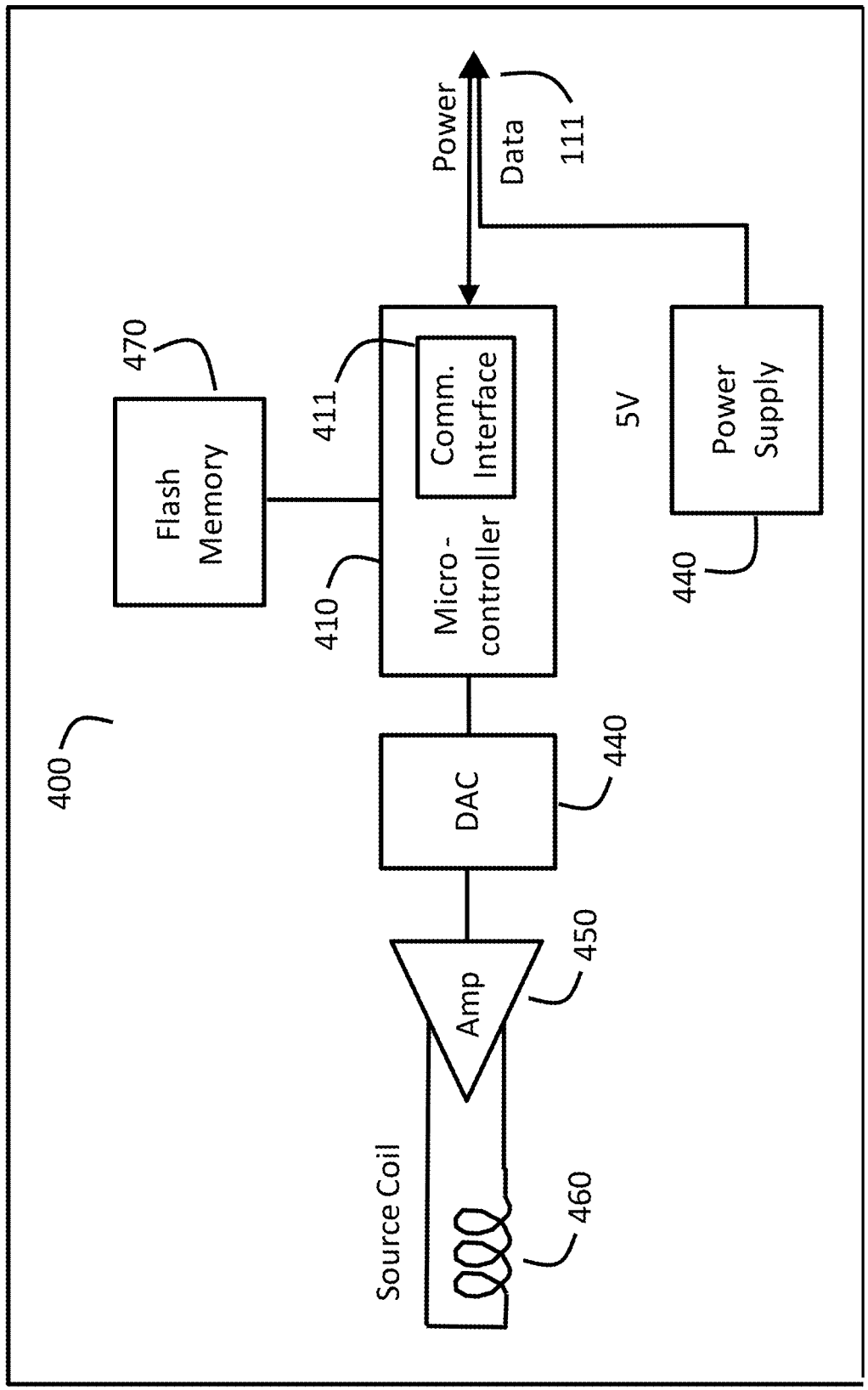
FIG. 21 a schematic diagram of one embodiment of a sound module for use in medical simulation system.

Referring now to FIG. 21, a schematic diagram of one embodiment of a sound module 400 is shown. In this embodiment, a microcontroller 410 has an embedded communication interface 411 that communicates over the communication and power bus 111. A power supply 430 regulates the voltage supplied by the communication and power bus 111 (e.g., 24V) to the voltage required by the electronics (e.g., 5V). In response to commands received over the communication interface, the microcontroller 410 retrieves the specified sound from a memory 470, for example, and outputs a digitized sound stream to a digital-to-analog converter (DAC) 440. The output from the DAC 440 is amplified by an amplifier (Amp) 450 that drives the source coil 460. Storing the sound files in the memory 470 reduces the need to stream the sound data over the communication interface which would occupy significant bandwidth over the interface and take processing resources from the source processor. With the sound files stored in the memory 470, the microcontroller 410 can handle sound generation based on commands received over the communication and power bus 111.

Figure 22:
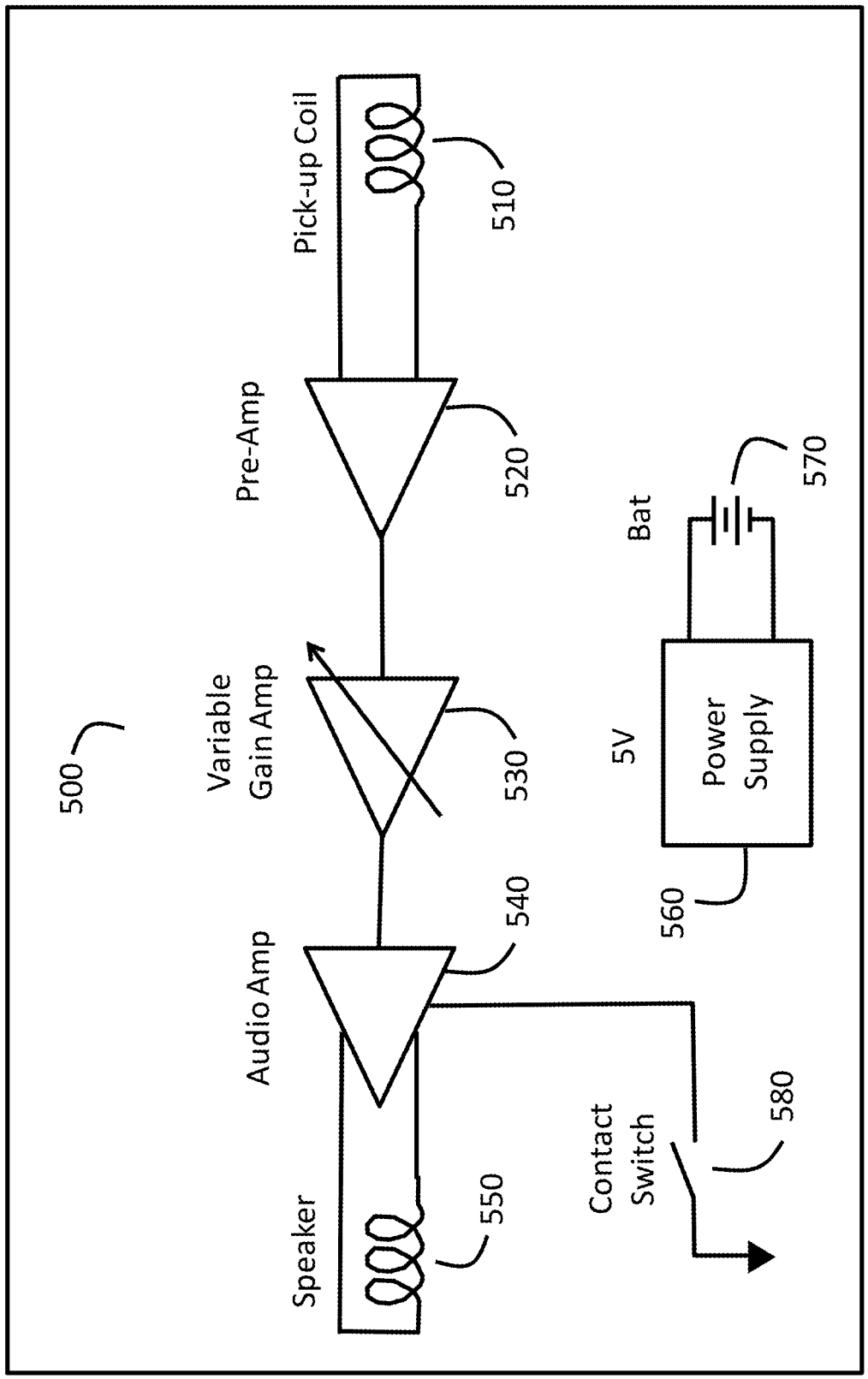
FIG. 22 a schematic diagram of one embodiment of a stethoscope module for use in medical simulation system.

Turning now to FIG. 22, a schematic diagram of one embodiment of the stethoscope module 500 is shown. In this embodiment a pre-amplifier 520 amplifies and filters the signal from a pick-up coil 510. The output of pre-amplifier 520 goes to a variable gain amplifier 530 that further amplifies the signal and provides a user gain control. The signal then goes to an audio amplifier 540 that drives a speaker 550. The speaker 550 is externally coupled to the bell of a stethoscope allowing the user to hear the sound picked up by the pick-up coil 510. A contact switch 580 is closed when the stethoscope module 500 is brought in contact with the manikin 103 and is connected to the enable line that is enabled when grounded, of the audio amplifier 540. Use of the contact switch 580 prevents sound from being generated when the stethoscope module 500 is held directly over the source coil 460, but not in contact with the manikin 103. Stethoscopes require contact with a patient to operate which is duplicated in the body sound simulation using the contact switch 580. The electronics in stethoscope module 500 can be powered by a power supply 560 and a battery 570, for example.

Many of the physiological functions simulated in the medical simulation system 100 are driven by a single parameter, such as heart rate or respiration rate. For example, heart rate determines how an ECG trace is displayed, when heart sounds occur, and when a pulse should happen. Similarly, respiration rate determines how a respiration trace is displayed, when lung sounds occur, and when chest motion happens. To maximize the reality of a simulation, these functions want to be synchronized so they not only occur at the correct rate, but also at the correct moment in time. This can be accomplished by sending a heartbeat trigger message and respiration trigger message to the system components. The components then create the desired simulation at the appropriate time.

Referring back to FIG. 18, upon receiving a trigger message, some components may create the desired simulation immediately such as displaying an ECG complex, while others may delay the simulation to better match human physiology. For example, a heart sounds are delayed from the start of heartbeat due to the time it takes for the heart to contract and relax. To exhibit this type of behavior, the components need to know their function and location in the medical simulation system 100. The same function may behave differently depending on its location. For example, a sound module intended to simulate lung sounds will have different characteristics than a sound module used to create bowel sounds. The location of module can be preprogrammed into the module prior to installation or the location can be "read" by the module based on a characteristic of the connector in that location, such as the resistance value between two pins on the connector.

Figure 23:
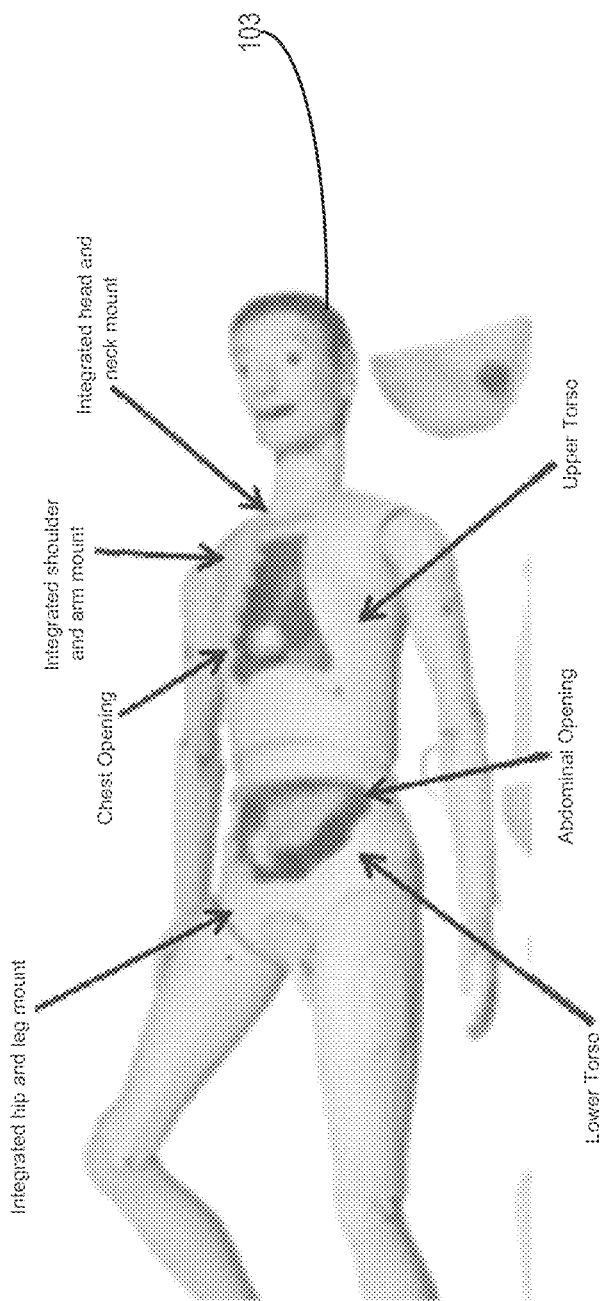
FIG. 23 is a perspective view of a conventional manikin and its components.

Turning now to FIG. 23, most manikin based medical simulators utilize a manikin 103 constructed of seven basic parts including an upper torso, a lower torso, a head, two arms, and two legs. The torso is split into upper and lower sections that are hinged to allow the manikin to be positioned in a bent or sitting position. The upper and lower torsos are typically constructed of a hollow plastic shell shaped like the human body and usually have a removable section for access into the torso cavity. Patient care simulator manikins typically have a small opening in the torso shells to gain access inside the parts to attach arms, legs, genitals, and a head. More complex, high-fidelity manikin simulators usually have larger openings that not only provide access to attach arms, legs, genitals, and a head, but also to access electronics, batteries, pneumatics, sensors, actuators, and the like that operate the simulator. In both types of manikin simulators, the upper torso has integrated shoulders with locations to mount arms and a neck/head assembly, and the lower torso has integrated hips with locations to mount legs. This type of design limits the physical modularity of the solution to optional limbs with the same attached mechanism (e.g., IV arm, blood pressure arm, trauma limbs, etc.) and simple modules such as interchangeable genitalia.

A common feature in medical simulation manikins is the ability to perform chest compressions for cardiopulmonary resuscitation (CPR). This feature is typically implemented using a movable or flexible chest plate supported by a compression mechanism (e.g., a spring, shock absorber and hinged support). The compression mechanism fills much of the chest cavity which inhibits other training modules, such a heart and lungs models, from being used. This design also produces chest motion during compression that is not natural and limits the way that breath motion can be simulated. Breath motion in such a system is typically done by inflating a bladder that moves the chest plate. The resulting motion is not natural since the sides of the rib cage do not move as occurs during actual breathing.

Referring now to FIGS. 24A through 24D, a torso manikin 600 for use in the medical simulation system 100 that accepts a wide variety of modules 106/107 is provided. The torso manikin 600 may provide for chest compressions without taking up space in the chest cavity, and provides realistic breathing motion. The torso manikin 600 includes a two piece back chassis 601 and 602 to which all components mount. The two pieces 601 and 602 are hinged together to allow the manikin to be placed in an inclined or sitting position. A circular mounting piece at the top 605 provides for mounting a head (not shown) with associated an airway. However, different mounts can be used to hold various heads with different capabilities and mounting requirements.

The torso manikin 600 also includes mounting cups 604R and 604L at the shoulders which allow attachment of common ball and socket type arms. The mounting cups 604R and 604L can be removed for insertion of more complex arm and shoulder assemblies. For example, an assembly such as an orthopedic arm and shoulder model could be inserted that allows for simulated shoulder surgery. Another example is a peripherally inserted central catheter (PICC) trainer that requires use of the shoulder area.

Figures 24A, 24B, 24C, 24D:
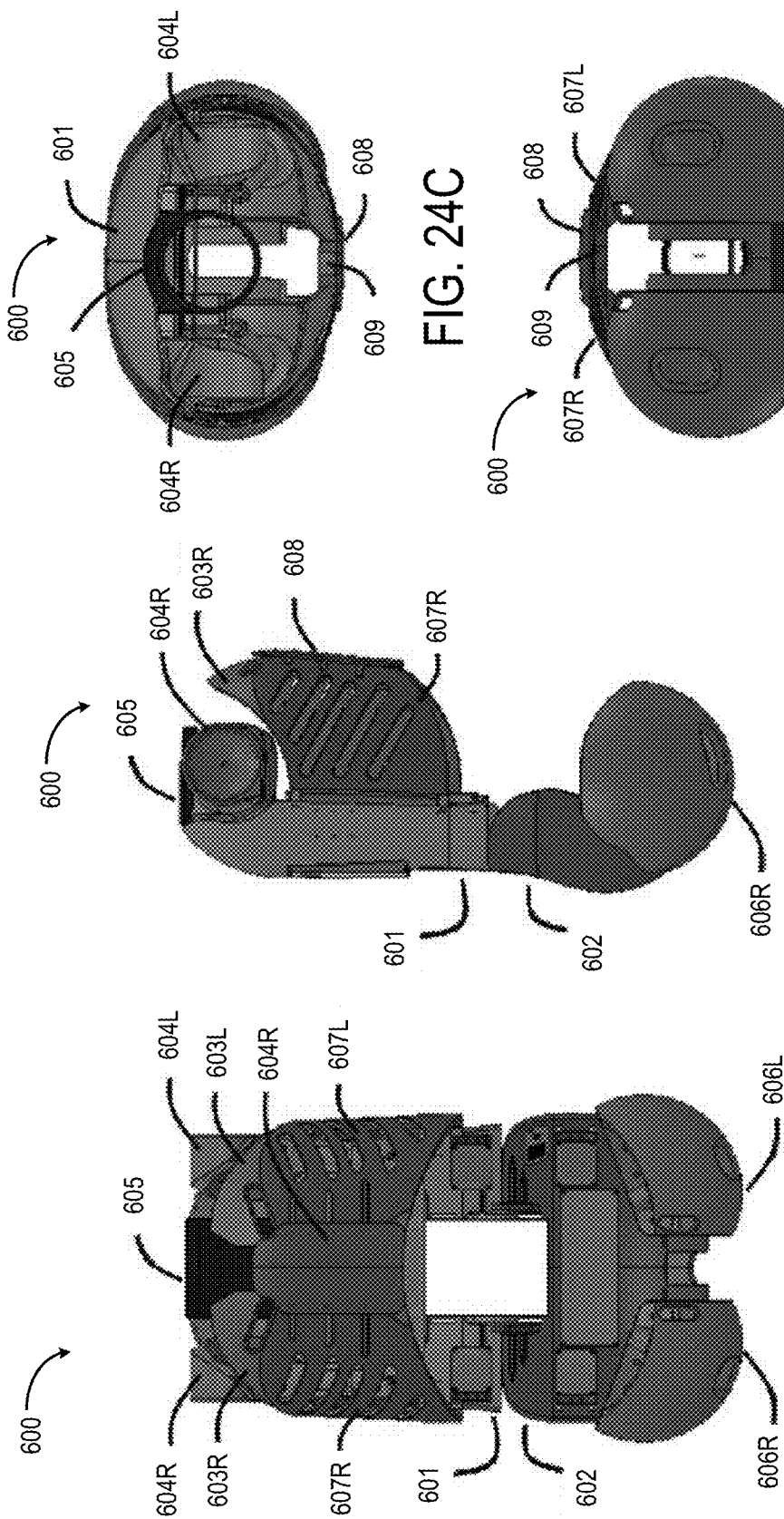
FIG. 24A is a front perspective view of a torso manikin to be implemented into the medical simulation system.
FIG. 24B is a side perspective view of the torso manikin of FIG. 25A.
FIG. 24C is a top perspective view of the torso manikin of FIG. 25A.
FIG. 24D is a bottom perspective view of the torso manikin of FIG. 25A.

The torso manikin 600 further includes a structural ribcage 603R and 603L that are hinged at the back chassis 601 and can open at the sternum to allow access to the chest cavity to insert heart and/or lung models, for example. Additionally, a mechanism 608 and 609, as best shown in FIGS. 24C and 24D, in the sternum may be provided to support CRP functionality and chest compressions. Further, breathing motion may be simulated using a thin flexible ribcage 607R and 607L that goes over the structural ribcage 603R and 603L. The motor and mechanism that move the flexible ribs are mounted in the area of the latissimus dorsi muscle so as not to take up valuable simulation space. The structural ribcage 603R and 603L and the flexible ribcage 607R and 607L are designed to leave the neck and should area open for modules such as a central line trainer. The flexible ribcage 607R and 607L may also have provisions for needle decompression and chest tube insertion. When the neck and shoulder openings are not used for modules, filler plates and/or a skin "shirt" may cover those openings (not shown).

As shown in FIG. 24A, ball mounts 606R and 606L are provided in the hip area of the torso manikin 600. The ball mounts 606R and 606L are used for mounting common ball and socket type legs. The ball mounts 606R and 606L can be removed for insertion of more complex hip and leg assemblies. In addition, the torso manikin 600 leaves the abdominal and pelvic area open for a host of modules. Examples of modules include, but are not limited to, male and female pelvic trainers, perineal repair trainer, urinary catheter trainers, paracentesis models, hernia models, models that allow practice of varying procedures for gall bladder, bladder, kidney, and colon as well as L4 to S1 fusion, and birthing models. Other models can include, but are not limited to a laparoscopic model, an injection model, a suturing model, a CPR module, a pulse module, a heart model, a model of lungs, a shoulder model, a hip model, a breathing module, a cricothyrotomy trainer, a central line trainer, a blood pressure arm, a trauma arm, a trauma leg, or an airway model. A base model of the torso manikin 600 will have "fillers" that occupy these spaces (not shown). Further, the torso manikin 600 may also include an opening in the back of the chassis 601 and 602 for lumbar puncture and epidural trainers, for example.

Turning now to FIGS. 25A through 25C, detailed views of the chest mechanism that provides for chest compressions (CPR) and realistic breathing motion while leaving the chest cavity open for other modules (e.g., heart and lung models) is provided. One end of the structural ribs 603R and 603L connect to the back plate 601 with hinges 610R and 610L, respectively. The other end of the structural ribs 603R and 603L connect to a sternum spring 609, such that the ends of structural ribs 603R and 603L are spaced apart by the sternum spring 609. The sternum spring 609 can be constructed of a flexible material having a web-like structure, for example, that allows the ends of the structural ribs 603R and 603L to move toward one another when a compressing force F, as shown in FIG. 25A, is applied to the sternum spring 609. When the compressing force F is removed from the sternum spring 609, the ends of the structural ribs 603R and 603L return to their original position. The sternum plate 608 includes a tab (not visible) in the center that passes through an opening in the sternum spring 609 holding it in place, but allowing it to "float". The sides of the sternum plate 608 contact ridges in the structural ribs 603R and 603L that come up through openings in the flexible ribs 607R and 608R. When a user presses on the sternum plate 608 to conduct CPR, the sternum plate 608 in turn presses on the structural ribs 603R and 603L causing them to compress the sternum spring 609. When the user releases the applied force from the sternum plate 608, the sternum spring 609 returns the structural ribs 603R and 603L to their original positions.

One end of the flexible ribs 607R and 607L connect to the structural ribs 603R and 603L respectively at the end of the structural ribs 603R and 603L that mate with the sternum spring 609. The flexible ribs 607R and 607L are substantially the same shape as the structural ribs 603R and 603L and lay on top of the structural ribs 603R and 603L. The free end of the flexible ribs 607R and 607L connect to mechanisms 611R and 611L (only 611R shown in FIG. 25B) which are located on the inside of the back chassis 601. A motor and gear box 612R and 612L (only 612R shown in FIG. 25B) drive the mechanism 611R and 611L pushing up on the flexible ribs 607R and 607L, thus causing them to "bow" creating a breathing-like motion. The sternum plate 608 overlaps the flexible ribs 607R and 607L causing a force to be applied to the sternum plate 608 when the flexible ribs 607R and 607L are bowed. The sternum plate 608 includes a tab (not visible) in the center that passes through an opening in the sternum spring 609 holding it in place but allowing it to "float". Thus when the flexible ribs 607R and 607L are bowed, causing a force to be applied to sternum plate 608, the sternum plate 608 rises. Similarly, when the flexible ribs 607R and 607L are relaxed, the sternum plate 608 returns to its resting position. A skin-like "shirt" may be place over the torso manikin 600 to create a realistic appearance. The flexible ribs 607R and 607L can be bowed separately, thereby allowing simulation of a collapsed lung by bowing just one side. Since the sternum plate 608 floats, it tilts when only one flexible rib 607R or 607L is bowed.

Figure 26B:
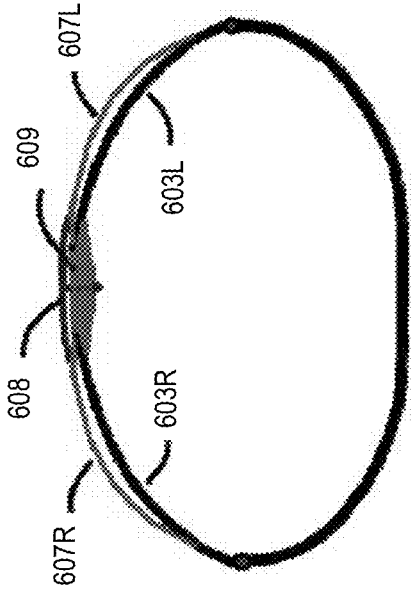
FIG. 26B is a cross-sectional view of the torso manikin of FIG. 25C showing the torso manikin in an expanded position during the breathing simulation.
Figure 26D:
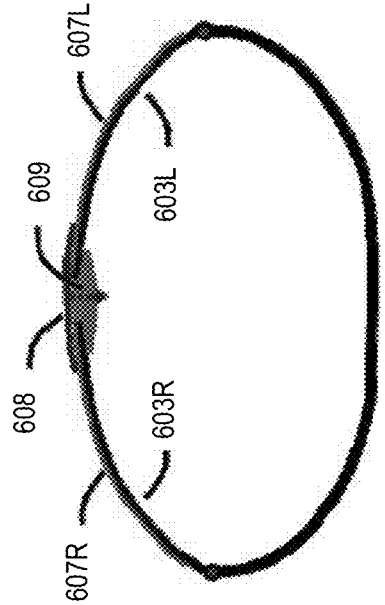
FIG. 26D is a cross-sectional view of the torso manikin of FIG. 25C showing the torso manikin in a compressed position during the CPR simulation.
Figure 26A:
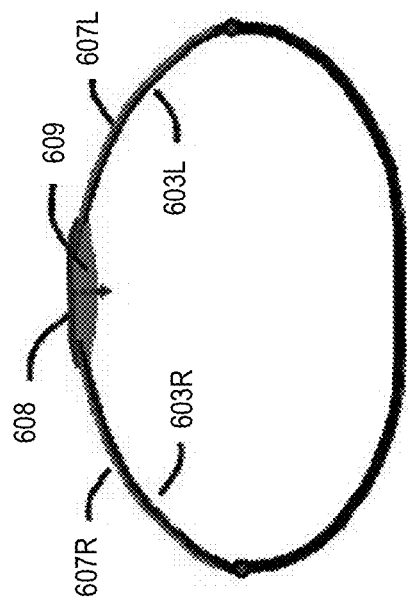
FIG. 26A is a cross-sectional view of the torso manikin of FIG. 25C showing the torso manikin in a relaxed position during a breathing simulation.
Figure 26C:
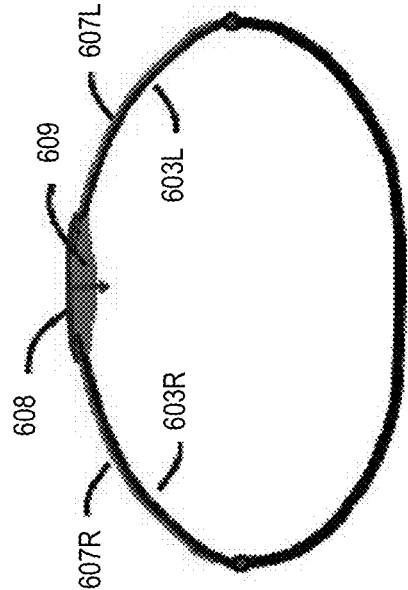
FIG. 26C is a cross-sectional view of the torso manikin of FIG. 25C showing the torso manikin in a relaxed position during a CPR simulation.

Referring now to FIGS. 26A through 26D, four cross-sectional views of the chest mechanism in various states of operation are shown. FIGS. 26A and 26B show how the chest mechanism moves for breathing. FIG. 26A shows the chest mechanism in the relaxed position simulating expiration, and FIG. 26B shows the flexible ribs 607R and 607L bowed simulating inhalation. FIGS. 26C and 26D show how the chest mechanism moves for CRP (i.e., chest compressions). FIG. 26C shows the chest mechanism in the relaxed position during CPR, and FIG. 26D shows the sternum spring 609 compressed as occurs when a user applies downward force on the sternum plate 608 during CPR.

The sternum plate 608 and the sternum spring 609 can be detached or removed from the structural ribs 603R and 603L allowing the structural ribs 603R and 603L to be spread open and pivot at the hinges 610R and 610L. This functionality can be used to gain increased access to the chest cavity of the torso manikin 600 to insert modules or to simulate cardio-thoracic surgery. For simulation of cardio-thoracic surgery, the sternum plate 608 and the sternum spring 609 can be replaced with a disposable, simulated sternum that can be cut (i.e., a median sternotomy performed) using a sternal saw after which rib spreaders can be used to separate the structural ribs 603R and 603L. Either the flexible nature of the structural ribs or a separate spring mechanism creates a force for the rib spreaders to work against and to return the ribs 603R and 603L to their normal position when the rib spreader is removed.

Various limb, shoulder, and hip modules may attach to the torso manikin 600. The mounting cups 604R and 604L at the shoulders, as shown in FIG. 24A, allow attachment of common ball and socket type arms. The mounting balls 606R and 606L at the hips allow attachment of common ball and socket type legs. These mounts can be removed for insertion of more complex arm and shoulder assemblies. These more advanced assemblies can either have mounts built in that provide for attachment to the back plate 601/602, or adapter mounts can be utilized.

The present invention has been described in terms of one or more preferred embodiments, and it should be appreciated that many equivalents, alternatives, variations, and modifications, aside from those expressly stated, are possible and within the scope of the invention.

The invention claimed is:

1. A manikin for medical simulation training, comprising
a supporting base;
a structural rib cage coupled to the supporting base, the structural rib cage supported by the supporting base without required structural attachment to other components of the manikin;
a flexible rib cage covering the structural rib cage, the flexible rib cage being dimensioned substantially the same as the structural rib cage;
a motor including a gear box coupled to the supporting base;
a drive mechanism coupled to the motor, the drive mechanism configured to provide a force on the flexible rib cage to create a breathing-like motion having a position in which flexible ribs of the flexible rib cage are bowed away from the structural rib cage; and
a set of mounts coupled to the supporting base, the set of mounts configured to receive at least one module that provides incremental functionality to the manikin; and
wherein the set of mounts are not required to be structurally attached to at least one of the structural rib cage and each other.

2. The manikin of claim 1, wherein the manikin is a partial-body manikin.

3. The manikin of claim 1, wherein the manikin is a full-body manikin.

4. The manikin of claim 1, wherein the structural rib cage includes provisions for at least one of a needle decompression and a chest tube insertion.

5. The manikin of claim 1, wherein the structural rib cage is capable of opening to allow access to a chest cavity of the manikin for insertion of the at least one module, the at least one module including at least one of a heart module and a lung module.

6. The manikin of claim 1, wherein the at least one module includes at least one of a male pelvic trainer, a female pelvic trainer, a perineal repair trainer, a urinary catheter trainer, a paracentesis model, a hernia model, a gall bladder model, a bladder model, a kidney model, a colon model, a birthing model, a laparoscopic model, an injection model, a suturing model, a CPR module, a pulse module, a heart model, a model of lungs, a shoulder model, a hip model, a breathing module, a cricothyrotomy trainer, a central line trainer, a blood pressure arm, a trauma arm, a trauma leg, and an airway model.

7. The manikin of claim 1, further comprising:
a sternum plate that overlaps the flexible ribs of the flexible rib cage.

8. A breathing mechanism for creating a breathing-like motion in a manikin, the breathing comprising:
a flexible rib cage covering a structural rib cage, the flexible rib cage being dimensioned substantially the same as the structural rib cage;
a motor including a gear box coupled to a supporting base of the manikin; and
a drive mechanism coupled to the motor, the drive mechanism configured to provide a force on the flexible rib cage to create a breathing-like motion having a position in which flexible ribs of the flexible rib cage are bowed away from the structural rib cage.

9. The breathing mechanism of claim 8, wherein the manikin is a partial-body manikin.

10. The breathing mechanism of claim 8, wherein the manikin is a full-body manikin.

11. The breathing mechanism of claim 8, wherein the structural rib cage includes provisions for at least one of a needle decompression and a chest tube insertion.

12. The breathing mechanism of claim 8, wherein the structural rib cage is capable of opening to allow access to a chest cavity of the manikin for insertion of at least one module including at least one of a heart module and a lung module.

13. The breathing mechanism of claim 8, further comprising:
a sternum plate that overlaps the flexible ribs of the flexible rib cage.

* * * * *